US008069225B2

(12) United States Patent
McCanne et al.

(10) Patent No.: US 8,069,225 B2
(45) Date of Patent: Nov. 29, 2011

(54) TRANSPARENT CLIENT-SERVER TRANSACTION ACCELERATOR

(75) Inventors: Steven McCanne, Berkeley, CA (US); Michael J. Demmer, San Francisco, CA (US); Arvind Jain, Santa Clara, CA (US); David Tze-Si Wu, Fremont, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 2039 days.

(21) Appl. No.: 10/640,405

(22) Filed: Aug. 12, 2003

(65) Prior Publication Data

US 2004/0215746 A1  Oct. 28, 2004

Related U.S. Application Data

(60) Provisional application No. 60/462,990, filed on Apr. 14, 2003.

(51) Int. Cl.
*G06F 15/16* (2006.01)
(52) U.S. Cl. .......................... 709/219; 706/21
(58) Field of Classification Search .................. 711/158; 717/169; 704/456; 709/223, 219, 236, 238, 709/231, 250, 203, 228; 707/1; 706/21
See application file for complete search history.

(56) References Cited

U.S. PATENT DOCUMENTS

| | | | |
|---|---|---|---|
| 5,754,774 A | 5/1998 | Bittinger et al. | |
| 6,178,461 B1 | 1/2001 | Chan et al. | |
| 6,219,642 B1 * | 4/2001 | Asghar et al. | 704/256.8 |
| 6,415,329 B1 | 7/2002 | Gelman et al. | |
| 6,519,576 B1 * | 2/2003 | Freeman | 706/21 |

(Continued)

FOREIGN PATENT DOCUMENTS

EP  0 813 326 A2  12/1997

(Continued)

OTHER PUBLICATIONS

Knutsson, Bjorn et al.; "Transparent Proxy Signalling"; *Journal of Communication Networks*, Mar. 2001, pp. 1-11.

(Continued)

*Primary Examiner* — Dustin Nguyen
(74) *Attorney, Agent, or Firm* — Philip H. Albert; Kilpatrick Townsend & Stockton LLP

(57) ABSTRACT

In a network that conveys requests from clients to servers and responses from servers to clients, a network transaction accelerator for accelerating transactions involving data transfer between at least one client and at least one server over a network comprising a client-side engine, a server-side engine and a transaction predictor configured to predict, based on past transactions, which transactions are likely to occur in the future between the client and server. The transaction predictor might be in the server-side engine, the client-side engine, or both. The client-side engine receives indications of requests from the client, a transaction buffer for storing results of predicted transactions received from the server or the server-side engine ahead of receipt of a corresponding request, and a collator for collating the requests from the client with the stored results or received results, wherein a request and a response that are matched by the collator are identified and the matched response is provided to the client in response to the matched request. The server-side engine receives indications of transactions including requests and responses and conveys requests to the server in response to actual transactions or predicted transactions.

33 Claims, 10 Drawing Sheets

U.S. PATENT DOCUMENTS

| | | | |
|---|---|---|---|
| 6,546,428 B2 | 4/2003 | Baber et al. | |
| 6,563,517 B1* | 5/2003 | Bhagwat et al. | 715/735 |
| 6,574,618 B2* | 6/2003 | Eylon et al. | 707/1 |
| 6,578,073 B1* | 6/2003 | Starnes et al. | 709/219 |
| 6,622,168 B1* | 9/2003 | Datta | 709/219 |
| 6,789,255 B1* | 9/2004 | Pedrizetti et al. | 717/169 |
| 6,820,133 B1* | 11/2004 | Grove et al. | 709/238 |
| 6,839,682 B1* | 1/2005 | Blume et al. | 705/10 |
| 6,874,017 B1 | 3/2005 | Inoue et al. | |
| 7,082,456 B2* | 7/2006 | Mani-Meitav et al. | 709/203 |
| 7,149,817 B2* | 12/2006 | Pettey | 709/250 |
| 7,224,839 B2* | 5/2007 | Zeineh | 382/232 |
| 7,619,545 B2 | 11/2009 | Samuels et al. | |
| 7,809,818 B2 | 10/2010 | Plamondon | |
| 7,827,237 B2 | 11/2010 | Plamondon | |
| 7,865,585 B2 | 1/2011 | Samuels et al. | |
| 7,916,047 B2 | 3/2011 | Samuels et al. | |
| 2002/0013853 A1 | 1/2002 | Baber et al. | |
| 2002/0023145 A1* | 2/2002 | Orr et al. | 709/219 |
| 2002/0029326 A1* | 3/2002 | Reuter et al. | 711/206 |
| 2002/0087547 A1 | 7/2002 | Kausik et al. | |
| 2002/0107971 A1* | 8/2002 | Bailey et al. | 709/231 |
| 2002/0138511 A1 | 9/2002 | Psounis et al. | |
| 2002/0147895 A1* | 10/2002 | Glance et al. | 711/158 |
| 2002/0194382 A1 | 12/2002 | Kausik et al. | |
| 2003/0009583 A1* | 1/2003 | Chan et al. | 709/236 |
| 2004/0088376 A1 | 5/2004 | McCanne et al. | |
| 2004/0215746 A1 | 10/2004 | McCanne et al. | |

FOREIGN PATENT DOCUMENTS

| | | |
|---|---|---|
| WO | WO 01/63420 A1 | 8/2001 |

OTHER PUBLICATIONS

Amer et al., "File Access Prediction with Adjustable Accuracy," *Conf. Proc. of 2002 IEEE Int. Performance, Computing, and Communications*, 21:131-140, conference held Apr. 3-5, 2002 in Phoenix, AZ.

Padmanabhan et al., "Using Predictive Prefetching to Improve World Wide Web Latency," *IEEE Transactions on Antennas and Propagation*, 26(3):22-36 (1996).

Caceres, Ramon et al., "Webb Proxy Caching: The Devil Is In the Details," Jun. 1998, *Proceedings of the Workshop on Internet Server Performance*, Madison, Wisconsin, pp. 111-118.

Deshpande, Mukund et al., "Selective Markov Models for Predicting Web-Page Accesses," 2004, *ACM Transactions on Internet Technology*, vol. 4, Issue 2, pp. 163-184.

Fan, Li et al., "Summary Cache: A Scalable Wide Area Web Cache Sharing Protocol," Jun. 2000, *Proceedings of the IEEE/ACM Transactions on Networking*, vol. 8, No. 3; pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

Griffioen, James et al., "Reducing File System Latency using a Predictive Approach," Jun. 1994, *Proceedings of the USENIX Summer 1994 Technical Conference on USENIX*, Technical Conference, vol. 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer," May 2006, *Third Symposium on Networked Systems Design and Implementation*.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

Office Action in U.S. Appl. No. 12/191,514 dated May 17, 2011.

\* cited by examiner

TRANSPARENT CLIENT-SERVER TRANSACTION ACCELERATOR

CROSS-REFERENCES TO RELATED APPLICATIONS

This application claims priority from U.S. Provisional Patent Application No. 60/462,990 entitled "Transport-Level Network Accelerator" filed Apr. 14, 2003 and is incorporated by reference herein for all purposes.

The present disclosure is related to the following commonly assigned co-pending U.S. patent applications:

U.S. patent application Ser. No. 10/285,315 entitled "Transaction Accelerator for Client-Server Communication Systems" (hereinafter "McCanne I") filed on Oct. 30, 2002 and is incorporated by reference herein for all purposes;

U.S. patent application Ser. No. 10/285,330 entitled "Content-Based Segmentation Scheme for Data Compression in Storage and Transmission Including Hierarchical Segment Representation" (hereinafter "McCanne II") filed on Oct. 30, 2002 and is incorporated by reference herein for all purposes; and U.S. patent application Ser. No. 10/640,562 know U.S. Pat. No. 7,318,100) entitled "Cooperative Proxy Auto-Discovery and Connection Interception" (hereinafter "McCanne IV") filed concurrently herewith and is incorporated by reference herein for all purposes.

FIELD OF THE INVENTION

The present invention relates to data transport over networks in general and more particularly may relate to improvements in data transport at the transport level between a client and a server.

BACKGROUND OF THE INVENTION

Local Area Network (LAN) communication is characterized by generous bandwidths, low latencies and considerable enterprise control over the network. By contrast, Wide Area Networks (WANs) often have lower bandwidths and higher latencies than LANs and often have a measure of network control that is outside the enterprise for which the WAN is being used.

Wide-area client-server applications are a critical part of almost any large enterprise. A WAN might be used to provide access to widely used and critical infrastructure, such as file servers, mail servers and networked storage. This access most often has very poor throughput when compared to the performance across a LAN. Whether an enterprise is taking a centralized approach or a distributed approach, high performance communication across the WAN is essential in order to minimize costs and maximize productivity. Enterprise IT managers today typically take one of two approaches to compensate for the performance challenges inherent in WANs:

1. If the IT infrastructure is decentralized and they intend to keep it that way, corporate network and server managers typically have to deploy local file servers, data storage, mail servers, and backup systems with some redundancy in each remote office to ensure fast and reliable access to critical data and applications at each office. They also may maintain over-provisioned WAN links in order to enable reasonable levels of performance for file transfers and similar data-intensive tasks.
2. If the IT infrastructure is already centralized or semi-centralized, the enterprise will be faced with a constant demand for "more bandwidth" to remote sites in an effort to improve the performance for distributed users.

Causes of Poor WAN Throughput

The two primary causes of the slow throughput on WANs are well known: high delay (or latency) and limited bandwidth. The "bandwidth" of a network of channel refers to measure of the number of bits that can be transmitted over a link or path per unit of time. "Latency" refers to a measure of the amount of time that transpires while the bits traverse the network, e.g., the time it takes a given bit transmitted from the sender to reach the destination. "Round-trip time" refers to the sum of the "source-to-destination" latency and the "destination-to-source" latency. If the underlying paths are asymmetric, the round-trip latency might be different than twice a one-way latency. The term "throughput" is sometimes confused with bandwidth but refers to a measure of an attained transfer rate that a client-server application, protocol, etc. achieves over a network path. Throughput is typically less than the available network bandwidth.

The speed of light, a fundamental and fixed constant, implies that information transmitted across a network always incurs some nonzero latency as it travels from the source to the destination. In practical terms, this means that sending a packet from Silicon Valley to New York and back could never occur faster than about 30 milliseconds (ms), the time information in an electromagnetic signal would take to travel that distance in a direct path cross-country. In reality, this cross-country round trip time is more in the range of 100 ms or so, as signals in fiber or copper do not always travel at the speed of light in a vacuum and packets incur processing delays through each switch and router. This amount of latency is quite significant as it is at least two orders of magnitude higher than typical sub-millisecond LAN latencies.

Other round-trips might have more latency. Round trips from the West Coast of the U.S. to Europe can be in the range of 100-200 ms, and some links using geo-stationary satellites into remote sites can have latencies in the 500-800 ms range. With latencies higher than about 50 ms, many client-server protocols and applications will function poorly relative to a LAN as those protocols and applications expect very low latency.

While many employees routinely depend upon Fast Ethernet (100 Mbps) or Gigabit Ethernet (1 Gbps) within most corporate sites and headquarters facilities, the bandwidth interconnecting many corporate and industrial sites in the world is much lower. Even with DSL, Frame Relay or other broadband technologies, WAN connections are slow relative to a LAN. For example, 1 Mbps DSL service offers only $\frac{1}{100}^{th}$ the bandwidth of Fast Ethernet and $\frac{1}{1,000}^{th}$ of what is available using Gigabit Ethernet.

While some places might have high bandwidth backbone networks, such as the Metro Ethernet available in South Korea and Japan, the latency and bandwidth issues persist whenever data needs to travel outside areas with such networks. For example, a Japanese manufacturer with plants in Japan and the U.S. might needs to send CAD/CAM files back and forth between plants. The latency from Japan to the East Coast of the U.S. might be as high as 200 ms and trans-Pacific bandwidth can be expensive and limited.

WAN network bandwidth limits almost always impact client-server application throughput across the WAN, but more bandwidth can be bought. With latency, lower latency cannot be bought if it would require faster than light communications. In some cases, network latency is the bottleneck on performance or throughput. This is often the case with window-based transport protocols such as TCP or a request-response protocol such as the Common Internet File System (CIFS) protocol or the Network File System (NFS) protocol. High network latency particularly slows down "chatty" applications, even if the actual amounts of data transmitted in each transaction are not large. "Chatty" applications are those in which client-server interactions involve many back-and-forth steps that might not even depend on each other. Adding bandwidth (or compressing data) does not improve the throughput of these protocols/applications when the round-trip time exceeds some critical point and once the latency reaches that critical point, throughput decays quickly.

This phenomenon can be understood intuitively: the rate of work that can be performed by a client-server application that executes serialized steps to accomplish its tasks is inversely proportional to the round-trip time between the client and the server. If the client-server application is bottlenecked in a serialized computation (i.e., it is "chatty"), then increasing the round-trip by a factor of two causes the throughput to decrease by a factor of two because it takes twice as long to perform each step (while the client waits for the server and vice versa).

More generally, the throughput of client-server applications that are not necessarily chatty but run over a window-based protocol (such as TCP) can also suffer from a similar fate. This can be modeled with a simple equation that accounts for the round-trip time (RTT) and the protocol window (W). The window defines how much data the sender can transmit before requiring receipt of an acknowledgement from the receiver. Once a window's worth of data is sent, the sender must wait until it hears from the receiver. Since it takes a round-trip time to receive the acknowledgement from the receiver, the rate at which data can be sent is simply the window size divided by the round trip time:

$$T=W/RTT$$

The optimal choice of window size depends on a number of factors. To perform well across a range of network conditions, a TCP device attempts to adapt its window to the underlying capacity of the network. So, if the underlying bottleneck bandwidth (or the TCP sender's share of the bandwidth) is roughly B bits per second, then a TCP device attempts to set its window to B×RTT, and the throughput, T, would be:

$$T=(B\times RTT)/RTT=B$$

In other words, the throughput would be equal to the available rate. Unfortunately, there are often other constraints. Many protocols, such as TCP and CIFS, have an upper bound on the window size that is built into the protocol. For example, the maximum request size in CIFS is 64 KB and in the original TCP protocol, the maximum window size was limited by the fact that the advertised window field in the protocol header is 16 bits, limiting the window also to 64 KB. While modern TCP stacks implement the window scaling method in RFC 1323 to overcome this problem, there are still many legacy TCP implementations that do not negotiate scaled windows, and there are more protocols such as CIFS that have application-level limits on top of the TCP window limit. So, in practice, the throughput is actually limited by the maximum window size (MWS)

$$T=\min(B\times RTT, MWS)/RTT<=B$$

Even worse, there is an additional constraint on throughput that is fundamental to the congestion control algorithm designed into TCP. This flaw turns out to be non-negligible in wide-area networks where bandwidth is above a few megabits and is probably the key reason why enterprises often fail to see marked performance improvements of individual applications after substantial bandwidth upgrades.

Essentially, this problem stems from conflicting goals of the TCP congestion control algorithm that are exacerbated in a high-delay environment. Namely, upon detecting packet loss, a TCP device reacts quickly and significantly to err on the side of safety (i.e., to prevent a set of TCP connections from overloading and congesting the network). Yet, to probe for available bandwidth, a TCP device will dynamically adjust its sending rate and continually push the network into momentary periods of congestion that cause packet loss to detect bandwidth limits. In short, a TCP device continually sends the network into congestion then aggressively backs off. In a high-latency enviromnent, the slow reaction time results in throughput limitations.

An equation was derived in the late 1990's that models the behavior of a network as a function of the packet loss rate that TCP induces and that equation is:

$$CWS=1.2\times S/sqrt(p)$$

As indicated by that equation, the average congestion window size (CWS) is roughly determined by the packet size (S) and the loss rate (p). Taking this into account, the actual throughput of a client-server application running over TCP is:

$$T=W/RTT=\min(MWS, CWS, B\times RTT)/RTT$$

FIG. 1 is a graph that illustrates this problem from a very practical perspective. That graph shows the performance of a TCP data transfer when the network is experiencing a low degree of network loss (less than ⅒ of 1 percent) for increasing amounts of latency. The bottom curve represents the TCP throughput achievable from a T1 line, which is roughly equal to the available bandwidth (1.544 Mb/s) all the way up to 100 ms latencies. The top curve, on the other hand, illustrates the performance impact of the protocol window at higher bandwidths. With a T3 line, the TCP throughput starts out at the available line rate (45 Mb/s) at low latencies, but at higher latencies the throughput begins to decay rapidly (in fact, hyperbolically). This effect is so dramatic that at a 100 ms delay (i.e., a typical cross-country link), TCP throughput is only 4.5 Mb/s of the 45 Mb/s link.

Under such conditions, application performance does not always increase when additional bandwidth is added. As FIG. 1 shows, if the round trip time (RTT) is greater than a critical point (just 15 ms or so in this example) then increasing the bandwidth of the link will only marginally improve throughput at higher latency and at even higher latencies, throughput is not increased at all with increases in bandwidth.

FIG. 2 graphs a surface of throughput model derived above, presuming a TCP transfer over a 45 Mb/s T3 link. The surface plots throughput as a function of both round-trip times and loss rates. This graph shows that both increasing loss and increasing latency impair performance. While latency has the more dramatic impact, they combine to severely impact performance. In environments with relatively low loss rates and normal WAN latencies, throughput can be dramatically limited.

Existing Approaches to Overcoming WAN Throughput Problems

Given the high costs and performance challenges of WAN-based enterprise computing and communication, many approaches have been proposed for dealing with these problems.

Perhaps the simplest approach to dealing with performance is to simply upgrade the available bandwidth in the network. Of course this is the most direct solution, but it is not always the most effective approach. First of all, contrary to popular belief, bandwidth is not free and the costs add up quickly for large enterprises that may have hundreds of offices. Second, as discussed earlier, adding bandwidth does not necessarily improve throughput. Third, in some places adding more bandwidth is not possible, especially across international sites, in remote areas, or where it is simply too expensive to justify.

Another approach is to embed intelligence in the applications themselves, e.g., to exploit that fact that data often changes in incremental ways so that the application can be designed to send just incremental updates to between clients and servers. Usually, this type of approach employs some sort of versioning system to keep track of version numbers of files (or data objects) so that differences between versioned data can be sent between application components across the network. For example, some content management systems have this capability and storage backup software generally employs this basic approach. However, these systems do not deal with scenarios where data is manipulated outside of their domain. For example, when a file is renamed and re-entered into the system the changes between the old and new versions are not captured. Likewise, when data flows between distinct applications (e.g., a file is copied out of a content management system and into a file system), versioning cannot be carried out between the different components.

This approach of managing versions and communicating updates can be viewed as one specific (and application-specific) approach to compression. More generally, data compression systems can be utilized to ameliorate network bandwidth bottlenecks. Compression is a process of representing one set of data with another set of data wherein the second set of data is, on average, a smaller number of bits than the first set of data, such that the first set of data, or at least a sufficient approximation of the first set of data, can be recovered from an inverse of the compression process in most cases. Compression allows for more efficient use of a limited bandwidth and might result in less latency, but in some cases, no latency improvement occurs. In some cases, compression might add to the latency, if time is needed to compress data after the request is made and time is needed to decompress the data after it is received. This may be able to be improved if the data can be compressed ahead of time, before the request is made, but that may not be feasible if the data is not necessarily available ahead of time for compression, or if the volume of data from which the request will be served is too large relative to the amount of data likely to be used.

One way to deploy compression is to embed it in applications. For example, a Web server can compress the HTML pages it returns before delivering them across the network to end clients. Another approach is to deploy compression in the network without having to modify the applications. For many years, network devices have included compression options as features (e.g., in routers, modems, dedicated compression devices, etc) [D. Rand, "The PPP Compression Control Protocol (CCP)", Request-for-Comments 1962, June 1996]. This is a reasonable thing to do, but the effectiveness is limited. Most methods of lossless data compression typically reduce the amount of data (i.e., bandwidth) by a factor of 1.5 to 4, depending on the inherent redundancy present. While helpful, it is not enough to dramatically change performance if the amount of data being sent is large or similar data is sent repeatedly, perhaps over longer time scales. Also, when performance is limited by network latency, compressing the underlying data will have little or no impact.

Rather than compress the data, another approach to working around WAN bottlenecks is to replicate servers and server data in local servers for quick access. This approach in particular addresses the network latency problem because a client in a remote site can now interact with a local server rather than a remote server. There are several methods available to enterprises to store redundant copies of data in replicated file systems, redundant or local storage servers, or by using any number of distributed file systems. The challenge with this kind of approach is the basic problem of managing the ever-exploding amount of data, which requires scaling up storage, application and file servers in many places, and trying to make sure that the files people need are indeed available where and when they are needed. Moreover, these approaches are generally non-transparent, meaning the clients and servers must be modified to implement and interact with the agents and/or devices that perform the replication function. For example, if a file server is replicated to a remote branch, the server must be configured to send updates to the replica and certain clients must be configured to interact with the replica while others need to be configured to interact with the original server.

Rather than replicate servers, another approach is to deploy transport-level or application-level devices called "proxies", which function as performance-enhancing intermediaries between the client and the server. In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

With a proxy situated between the client and server, the performance impairments of network latency can be addressed by having the proxy cache data. Caching is a process of storing previously transmitted results in the hopes that the user will request the results again and receive a response more quickly from the cache than if the results had to come from the original provider. Caching also provides some help in mitigating both latency and bandwidth bottlenecks, but in some situations it does not help much. For example, where a single processor is retrieving data from memory it controls and does so in a repetitive fashion, as might be the case when reading processor instructions from memory, caching can greatly speed a processor's tasks. Similarly, file systems have employed caching mechanisms to store recently accessed disk blocks in host memory so that subsequent accesses to cached blocks are completed much faster than reading them in from disk again as in BSD Fast File System [McKusick, et al., "A Fast File System for BSD", ACM Transactions on Computer Systems, Vol. 2(3), 1984], the Log-based File System [Rosenblum and Ousterhout, "The Design and Implementation of a Log-structured File System", ACM Transactions on Computer Systems, Vol. 10(1), 1992], etc. In a typical cache arrangement, a requestor requests data from some memory, device or the like and the results are provided to the requestor and stored in a cache having a faster response time than the original device supplying the data. Then, when the requestor requests that data again, if it is still in the cache, the cache can return the data in response to the request before the original device could have returned it and the request is satisfied that much sooner.

Caching has its difficulties, one of which is that the data might change at the source and the cache would then be supplying "stale" data to the requestor. This is the "cache consistency" problem. Because of this, caches are often "read only" requiring that changes to data be transmitted through the cache back to the source in a "write-through" fashion.

Another problem with caching is that the original source of the data might want to track usage of data and would not be aware of uses that were served from the cache as opposed to from the original source. For example, where a Web server is remote from a number of computers running Web browsers that are "pointed to" that Web server, the Web browsers might cache Web pages from that site as they are viewed, to avoid delays that might occur in downloading the Web page again. While this would improve performance in many cases, and reduce the load on the Web server, the Web server operator might try to track the total number of "page views" but would be ignorant of those served by the cache. In some cases, an Internet service provider might operate the cache remote from the browsers and provide cached content for a large number of browsers, so a Web server operator might even miss unique users entirely.

Where loose consistency can be tolerated, caching can work remarkably well. For example, the Domain Name System (DNS), dating back to the early 1980's, employs caching extensively to provide performance and scalability across the wide area. In this context, providing only loose consistency semantics has proven adequate. In DNS, each "name server" manages a stored dataset that represents so-called "resource records" (RR). While DNS is most commonly used to store and manage the mappings from host names to host addresses in the Internet (and vice versa), the original DNS design and its specification allow resource records to contain arbitrary data. In this model, clients send queries to servers to retrieve data from the stored data set managed by a particular server. Clients can also send queries to relays, which act as proxies and cache portions of master name servers' stored datasets. A query can be "recursive", which causes the relay to recursively perform the query on behalf of the client. In turn, the relay can communicate with another relay and so forth until the master server is ultimately contacted. If any relay on the path from the client to the server has data in its cache that would satisfy the request, then it can return that data back to the requestor.

As with DNS, the mechanism underlying Web caching provides only a loose model for consistency between the origin data and the cached data. Generally, Web data is cached for a period of time based on heuristics or hints in the transactions independent of changes to the origin data. This means that cached Web data can occasionally become inconsistent with the origin server and such inconsistencies are simply tolerated by Web site operators, service providers, and users as a reasonable performance trade-off. Unfortunately, this model of loose consistency is entirely inappropriate for general client-server communication such as networked file systems. When a client interacts with a file server, the consistency model must be wholly correct and accurate to ensure proper operation of the application using the file system.

Cache consistency in the context of network file systems has been studied. The primary challenge is to provide a consistent view of a file to multiple clients when these clients read and write the file concurrently. When multiple clients access a file for reading and at least one client accesses the same file for writing, a condition called "concurrent write sharing" occurs and measures must be taken to guarantee that reading clients do not access stale data after a writing client updates the file.

In the original Network File System (NFS) [Sandberg et al., "Design and Implementation of the Sun Network Filesystem", In Proc. of the Summer 1985 USENIX Conference, 1985], caching is used to store disk blocks that were accessed across the network sometime in the past. An agent at the client maintains a cache of file system blocks and, to provide consistency, their last modification time. Whenever the client reads a block, the agent at the client checks to determine if the requested block is in its local cache. If it is and the last modification time is less than some configurable parameter (to provide a medium level of time-based consistency), then the block is returned by the agent. If the modification time is greater than the parameter, then the last-modification time for the file is fetched from the server. If that time is the same as the last modification time of the data in the cache, then the request is returned from the cache. Otherwise, the file has been modified so all blocks of that file present in the local cache are flushed and the read request is sent to the server. To provide tighter consistency semantics, NFS can employ locking via the NFS Lock Manager (NLM). Under this configuration, when the agent at the client detects the locking condition, it disables caching and thus forces all requests to be serviced at the server, thereby ensuring strong consistency.

When blocks are not present in the local cache, NFS attempts to combat latency with the well-known "read-ahead" algorithm, which dates back to at least the early 1970's as it was employed in the Multics I/O System [Feiertag and Organick, "The Multics Input/Output System", Third ACM Symposium on Operating System Principles, October 1971]. The read-ahead algorithm exploits the observation that clients often open files and sequentially read each block. That is, when a client accesses block k, it is likely in the future to access block k+1. In read-ahead, a process or agent fetches blocks ahead of the client's request and stores those blocks in the cache in anticipation of the client's forthcoming request. In this fashion, NFS can mask the latency of fetching blocks from a server when the read-ahead turns out to successfully predict the client read patterns. Read-ahead is widely deployed in modern file systems.

In the Andrew File System (AFS) [Howard, "An Overview of the Andrew File System", In Proc. of the USENIX Winter Technical Conference, February 1988], "whole-file" caching is used instead of block-based caching. Here, when a client opens a file, an agent at the client checks to see if the file is resident in its local disk cache. If it is, it checks with the server to see if the cached file is valid (i.e., that there have not been any modifications since the file was cached). If not (or if the file was not in the cache to begin with), a new version of the file is fetched from the server and stored in the cache. All client file activity is then intercepted by the agent at the client and operations are performed on the cached copy of the file. When the client closes the file, any modifications are written back to the server. This approach provides only "close-to-open" consistency because changes by multiple clients to the same file are only serialized and written back to the server on each file close operation.

Another mechanism called "opportunistic locking" was employed by the Server Message Block (SMB) Protocol, now called CIFS, to provide consistency. In this approach, when a file is opened the client (or client agent) can request an opportunistic lock or oplock associated with the file. If the server grants the oplock, then the client can assume no modifications will be made to file during the time the lock is held. If another client attempts to open the file for writing (i.e., concurrent write sharing arises), then the server breaks the oplock previously granted to the first client, then grants the second client write access to the file. Given this condition, the first client is forced to send all reads to the server for the files for which it does not hold an oplock. A similar mechanism was employed in the Sprite distributed file system, where the server would notify all relevant clients when it detected concurrent write sharing [Nelson, Welch, and Ousterhout, "Caching in the Sprite Network File System", ACM Transactions on Computer Systems, 6(1), February, 1988].

When consistency mechanisms are combined with network caching, a great deal of complexity arises. For example, if a data caching architecture such as that used by DNS or the Web were applied to file systems, it would have to include a consistency protocol that could manage concurrent write sharing conditions when they arise. In this model, each node, or network cache, in the system contains a cache of file data that can be accessed by different clients. The file data in the cache is indexed by file identification information, relating the image of data in the cache to the server and file it came from. Just like NFS, a cache could enhance performance in certain cases by using read-ahead to retrieve file data ahead of a client's request and storing said retrieved data in the cache. Upon detecting when concurrent write sharing, such a system could force all reads and writes to be synchronized at a single caching node, thereby assuring consistency. This approach is burdened by a great deal of complexity in managing consistency across all the caches in the system. Moreover, the system's concurrency model assumes that all file activity is managed by its caches; if a client modifies data directly on the server, consistency errors could arise. Also, its ability to overcome network latency for client accesses to data that is not resident in the cache is limited to performing file-based read-ahead. For example, in NFS, a client that opens a file must look up each component of the path (once per round-trip) to ultimately locate the desired file handle and file-based read-ahead does nothing eliminate these round-trips. Finally, the system must perform complex protocol conversions between the native protocols that the clients and servers speak and the systems internal caching protocols, effectively requiring that the system replicate the functionality of a server (to interoperate with a client) and a client (to interoperate with a server).

A different approach to dealing with network latency when clients access data that is not in the cache is to predict file access patterns. A number of research publications describe approaches that attempt to predict the next file (or files) a client might access based on the files it is current accessing and has accessed in the past, see [Amer. et al., "File Access Prediction with Adjustable Accuracy", In Proc. of the International Performance Conference on Computers and Communication, April 2002], [Lei and Duchamp, "An Analytical Approach to File Prefetching", In Proc. of the 1997 Annual USENIX Conference, January 1997], [Griffioen and Appleton, "Reducing File System Latency using a Predictive Approach", In Proc. of the 1994 Summer USENIX Conference, June 1994], [Kroeger and Long, "The Case for Efficient File Access Pattern Modeling", In Proc. of the Seventh Workshop on Hot Topics in Operating Systems, March 1999]. Based on these prediction models, these systems pre-fetch the predicted files by reading them into a cache. Unfortunately, this approach presumes the existence of a cache and thus entails the complexities and difficulties of cache coherency.

In the context of the World-wide Web, other research has applied this prediction concept to Web objects [Padmanabhan and Mogul, "Using Predictive Prefetching to Improve World Wide Web Latency", ACM SIGCOMM, Computer Communication Review 26(3), July 1996]. In this approach, the server keeps track of client access patterns and passes this information as a hint to the client. The client in turn can choose to pre-fetch into its cache the URLs that correspond to the hinted objects. Again, this approach presumes the existence of a cache, and can be deployed without disrupting the semantics of the Web protocols only because the Web is generally read-only and does not require strong consistency.

Unfortunately, while many of the above techniques solve some aspects of WAN performance problems, they still have some shortcomings.

BRIEF SUMMARY OF THE INVENTION

In a network that conveys requests from clients to servers and responses from servers to clients, a network transaction accelerator for accelerating transactions involving data transfer between at least one client and at least one server over a network, wherein a transaction involves a request and at least one response in response to the request, comprising a client-side engine coupled to a client, a server-side engine coupled to the server and a transaction predictor configured to predict, based on past transactions, which transactions are likely to occur in the future between the client and server. The transaction predictor might be in the server-side engine, the client-side engine, or both. The client-side engine receives indications of requests from the client, a transaction buffer for storing results of predicted transactions received from the server or the server-side engine ahead of receipt of a corresponding request, and a collator for collating the requests from the client with the stored results or received results, wherein a request and a response that are matched by the collator are identified and the matched response is provided to the client in response to the matched request. The server-side engine receives indications of transactions including requests and responses and conveys requests to the server in response to actual transactions or predicted transactions.

The network transaction accelerators might also perform segment cloning using persistent segment storage at each end. The network transaction accelerators might also comprise a transaction mapping table that maps transaction identifiers of actual requests and transaction identifiers of synthetic requests to mapped transaction identifiers, such that responses to requests are uniquely identifiable by their mapped transaction identifiers even when transaction identifiers of synthetic requests might overlap with transaction identifiers of actual requests and a transaction mapper that maps transaction to a mapped transaction identifier and replaces the transaction's identifier as received by the network transaction accelerator with the mapped transaction identifier for received requests that are forwarded toward the server and replaces the mapped transaction identifier with the replaced transaction identifier for responses that are returned toward the client.

Other features and advantages of the invention will be apparent in view of the following detailed description and preferred embodiments.

BRIEF DESCRIPTION OF THE DRAWINGS

FIG. 11 illustrates state diagrams for Markov models used for transaction prediction.

DETAILED DESCRIPTION OF THE INVENTION

Figure 1:
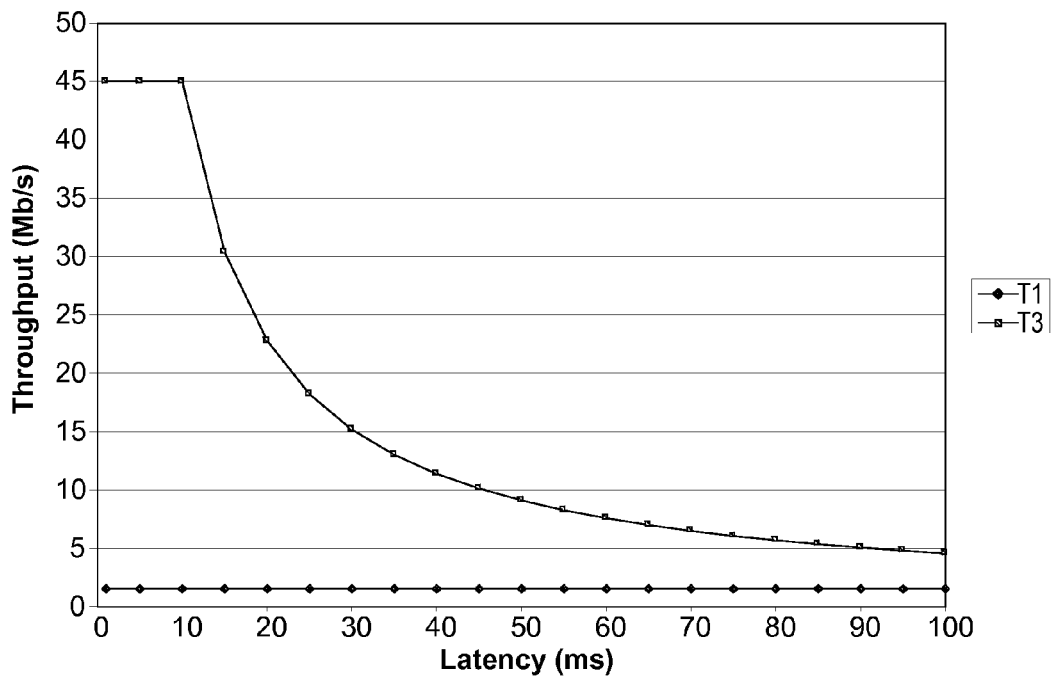
FIG. 1 is a graph of throughput versus latency illustrating throughput degradation for high latencies.
Figure 2:
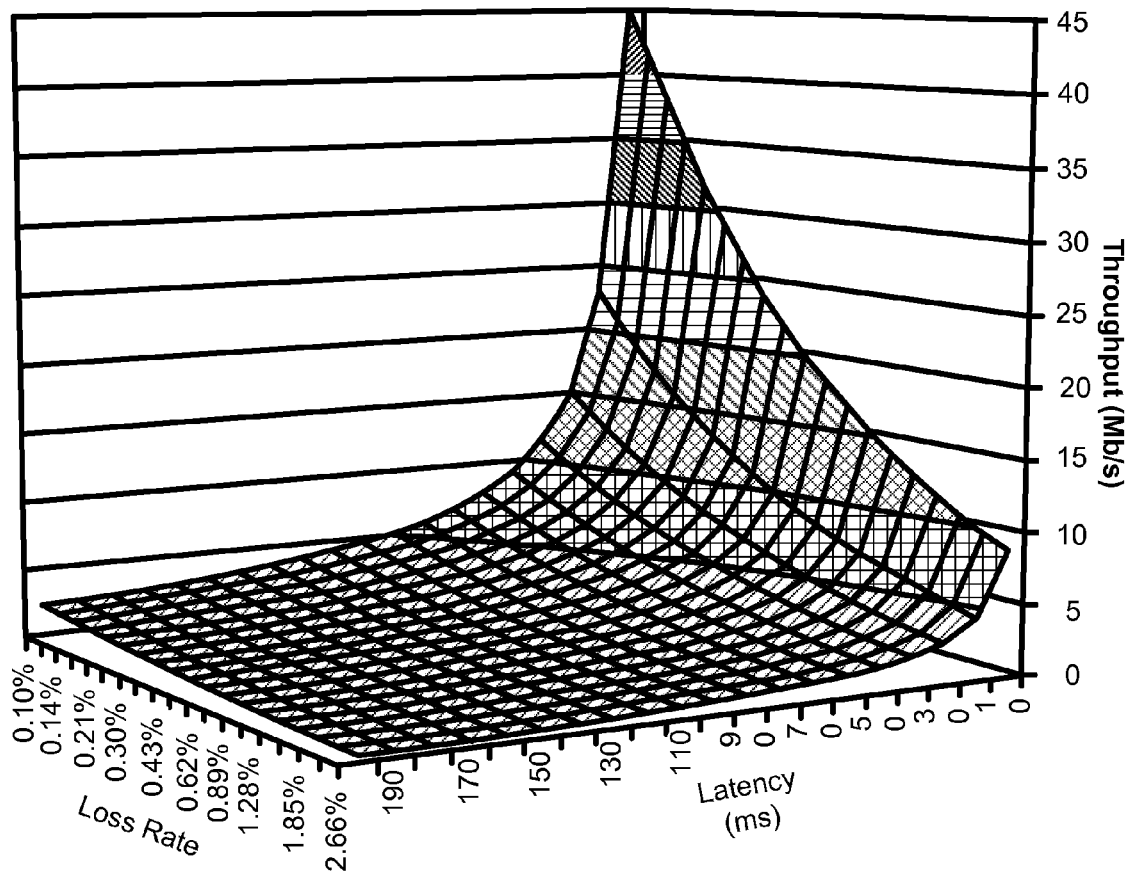
FIG. 2 is a graph of loss rate, latency and throughput illustrating throughput degradation for high latencies or large loss rates.

The present invention has many applications, as will be apparent after reading this disclosure. In describing an embodiment of a data transport and optimization system according to the present invention, only a few of the possible variations are described. Other applications and variations will be apparent to one of ordinary skill in the art, so the invention should not be construed as narrowly as the examples, but rather in accordance with the appended claims.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc., initiating the transaction is referred to as the "client" and the computer, computer device, etc., that responds, or is expected to respond, is referred to as the "server". Data can flow in either direction. For example, a file system client might initiate a transaction by requesting a file read from a file server. The corresponding data will be returned from the server responding to the request, so in that case, the bulk of the data flows from the server to the client. However, where a client initiates a file write transaction, the bulk of the data flows from the client to the server, either as part of the initial request or as subsequent messages.

A transaction can be in multiple parts, but in a simple transaction, a client sends a request (data, a message, a signal, etc., explicitly being the request or indicative of, or representing, the request) to a server and the server responds with a response (data, a message, a signal, etc., explicitly being the response or indicative of, or representing, the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to herein as "nodes" with a channel assumed for communication between the nodes.

A transaction might begin with a client at one node making a request for file data directed to a server at another node, followed by a delivery of a response containing the requested file data. Other transactions might be a request for a specific part of a file, the entire file, all or some of another data construct, or a transaction might relate to data flowing from the requester or relate to a command. Examples of transactions include "read a block", "read a file", "read a stream", "write a block with this data" (an example of data flowing from the requester), "open a file", "perform a calculation on this data", "get an e-mail with these characteristics", "send an e-mail", "check for new e-mails", "list directory contents", etc.

Some transactions might involve large amounts of data flowing in one direction or both directions. Some transactions might even involve interactions having more than one requestor and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information.

Using some of the systems described herein, client access to a server (and vice versa where needed), can be "tunneled" through transaction accelerators that map transactions onto sequences of variable-length segments with content-induced segment cut points. The segments can be stored at various places, typically within high-speed access of both the clients and the servers, with the segments stored using a scalable, persistent naming system. The segments can be decoupled from file-system and other system data blocks and structures, so that a matching segment might be found in multiple contexts. Instead of caching files, blocks, or other system dependent constructs, segments can be stored and bound to references that are used to represent the segment contents.

Figure 3:
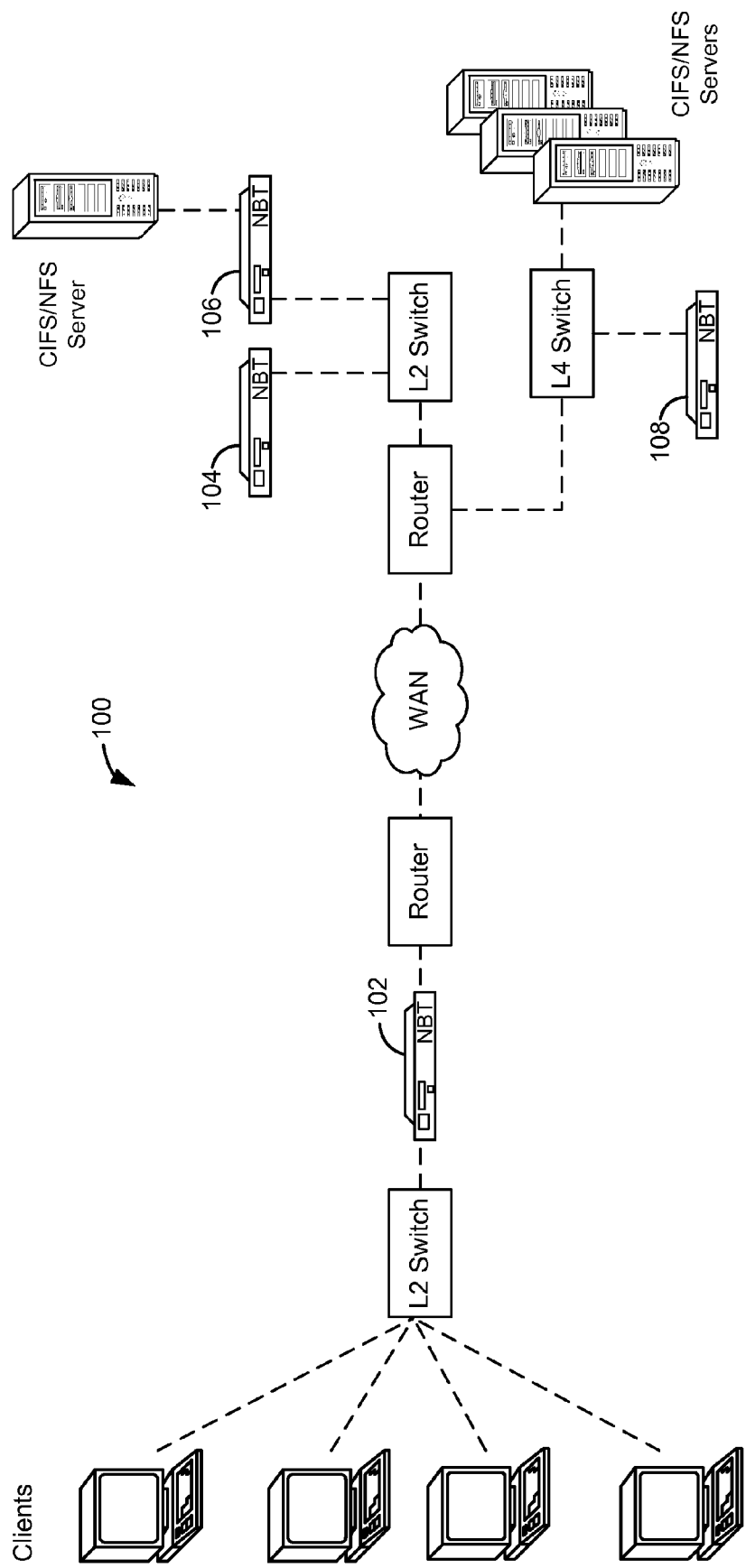
FIG. 3 is a schematic diagram of a network using acceleration engines for accelerating transactions, possibly also for segment cloning.

FIG. 3 illustrates one possible configuration 100 of a network that benefits from aspects of the present invention. As shown there, acceleration engines ("engines" for short) are interposed in or near a network path between one or more clients and one or more servers. In some implementations, the engine is implemented entirely in software, while in other implementations the engine might be implemented in hardware, firmware or some combination of hardware, firmware and/or software. For illustration purposes, engines are shown in the figures as hardware boxes, but it should be understood that the engine might be software running on a general-purpose computer or using the computing facilities of other devices on the network. For example, a special router or switch might be devised that runs the engine in software in addition to its regular function. In a specific embodiment, a dedicated engine appliance is deployed in the network infrastructure between client and server sites and might be based on the Linux™ operating system.

As will be described herein, the engines reduce bandwidth usage and reduce latency for transactions between clients and servers. Such transactions might include copying a file from a distant file server to a local storage device, backing up remote file servers to a main data center storage device, sending a very large CAD file to a colleague over a large distance, etc. As should be apparent from this description, transactions need not be limited to file related activities.

As used herein, "near" may refer to physical proximity, but can also refer to network proximity. Network proximity relates to performance attributes. As an example, two nodes of a LAN might be considered more near than two nodes separated by a slow network channel. Often is the case that large physical distances do not result in network proximity, but there are examples where two nodes can be physically close but faraway in network terms and where two nodes can be physically far away but relatively close in network terms. Preferably, engines are positioned to be in network proximity with the nodes that seek a benefit from the engines.

In various embodiments, the engine is a transport-level proxy that conceptually operates in pair-wise configurations, with one engine situated near one or more servers (the "server site") and another situated near clients (the "client site"). Engines communicate with one another in a paired fashion, i.e., a transaction between one client and one server might be accelerated using a particular client-side engine and a particular server-side engine. Engines might be clustered and meshed across a WAN, possibly allowing any engine to communicate directly with any other engine. While one engine might be described as a client-side engine and another engine described as a server-side engine, it should be understood that engines can be symmetric, such that data could be accelerated from the client to the server or from the server to the client. In addition, a given engine could be a client-side engine for one transaction and a server-side engine for another transaction, possibly involving the same network devices.

Engines can intercept client-server connections without interfering with normal client-server interactions, file semantics, or protocols. All client requests can be passed through to the server normally, while relevant traffic is optimized to improve performance.

In configuration 100, several deployment scenarios for engines are shown, such as a client-side engine 102 and server-side engines 104, 106, 108. Engine 102 is typically installed in the path so that appropriate transport connections can be intercepted and processed. At the server side, however, there is more flexibility. As shown in FIG. 3, the engine may be deployed completely out of path (engine 104), in-path directly in front of the servers (engine 106), or logically in-path but adjacent (engine 108) to a collection of servers that are load-balanced by a Layer 4 switch. A device configuration model is fairly generic so that an engine can support other sorts of topologies and configurations and even potentially fit into unanticipated scenarios. In particular, the client-side engine can also be deployed out of path, whereby the engine is assigned its own IP address and clients communicate directly with the client-side engine using that IP address (much as a Web client can communicate directly with a Web proxy cache using the Web cache's IP address).

Optimizations

In addition to possibly other functions, engines perform two core optimizations: a connection bandwidth-reducing technique called "segment cloning" (such as the segment cloning described in McCanne I) and a latency reduction and avoidance technique referred to herein as "transaction prediction". Some engines might perform just one of the two optimizations, and some engines might perform other operations as well. The two optimizations can work independently or in conjunction with one another depending on characteristics and workload of the data being sent across the network.

Segment cloning replicates data within and across the network as described in McCanne I. This protocol-independent format reduces transmissions of data patterns that appear subsequently in the system. Rather than attempt to replicate data blocks from a disk volume, or files from a file system, or even e-mail messages or Web content from application servers and maintain the necessary consistency, engines represent and store data in a protocol- and application-independent format that represents data in variable-length, compressed data units called "segments". A working set of segments is maintained in persistent storage within each engine and cloned into other engines on demand as data flows through the engines or is proactively moved ahead of demand based on intelligent replication policies. The elegance of the approach is that quite surprisingly there are no consistency issues to be tackled even in the presence of replicated data.

Engines also address latency problems using transaction prediction. By anticipating client behavior (based on past observations of client-server dialogues), engines speculatively inject transactions on behalf of a client based on a model of its past behavior. The result of the predicted transaction is buffered for a small window of time, normally at the client-side engine. When and if the client actually issues the predicted transaction, the result can be immediately returned, thereby hiding the effects of the wide-area round-trip. If the prediction fails because the client does not issue the predicted transaction within the window of time allotted for the predicted event, then the results are simply discarded. The amount of time predicted results are held before being discarded can be determined by a configurable parameter and in some embodiments the time is in the range of a few seconds.

The segment cloning and transaction prediction optimizations are synergistic, but it should be understood that they provide benefits even when used alone. By exploiting information known to the segment cloning stage, the transaction prediction logic can modulate its behavior and adjust its aggressiveness to limit its overall impact on the network. For example, if the server-side engine decides that it should perform a certain set of predictions on behalf of the client, it first passes the predicted results through a segmenter, e.g., as described in McCanne I. If these results are represented in a sufficiently small envelope of information (perhaps guided by the bandwidth policies described below), they can be shipped across the network to the client-side to potentially short-circuit the predicted client activity. If the results are too large, the prediction can simply be aborted, or the depth and/or scope of prediction can be reduced to adhere to prescribed bandwidth policies.

The combination of the two optimizations provides several important and attractive benefits to WAN client-server communication. Examples include:

Transparency. An engine can pass all transaction requests through to the server, just as if it were not deployed at all, so that applications and protocols can work normally without modification, just faster.

Efficiency. A segment cloning process is much more efficient than a file-based process or even block-based process in many instances. Even if a change is made in a file that affects every block of data in the file, the segment cloning system can still recognize commonality across segments and optimize for them. A caching algorithm based on blocks or files would not retain its optimization under those conditions.

Robustness. As files are edited and written to disk, new segments can be created and incorporated into the existing tree without disrupting the existing data structure.

Simplicity. Engines can be deployed in an application-independent manner. Complex cache coherency protocols are not required, and engines do not have to keep track of every file in every location on the network. Furthermore, because of the shared nature of the data in the segment store, the optimizations are much more broadly realized than alternate approaches.

Application Independent. Since the segments are created through a process that relies on the bit patterns themselves, with no knowledge required of the application in question, the segmentation and cloning process would be independent of the files and applications being used. If there are segments that are common across different filenames, or even across different applications, then the optimizations will still be useful.

Engine Architecture

Though the engine might appear as an infrastructure device with network interfaces and so forth, it can be embodied almost entirely in software. This software can be delivered in an appliance form-factor: pre-configured and installed on a qualified server. For example, it might be provided as hardware and software, with software pre-loaded on a microprocessor-based server with appliance hardware running the Linux™ operating system, Microsoft Windows, etc.

Figure 4:
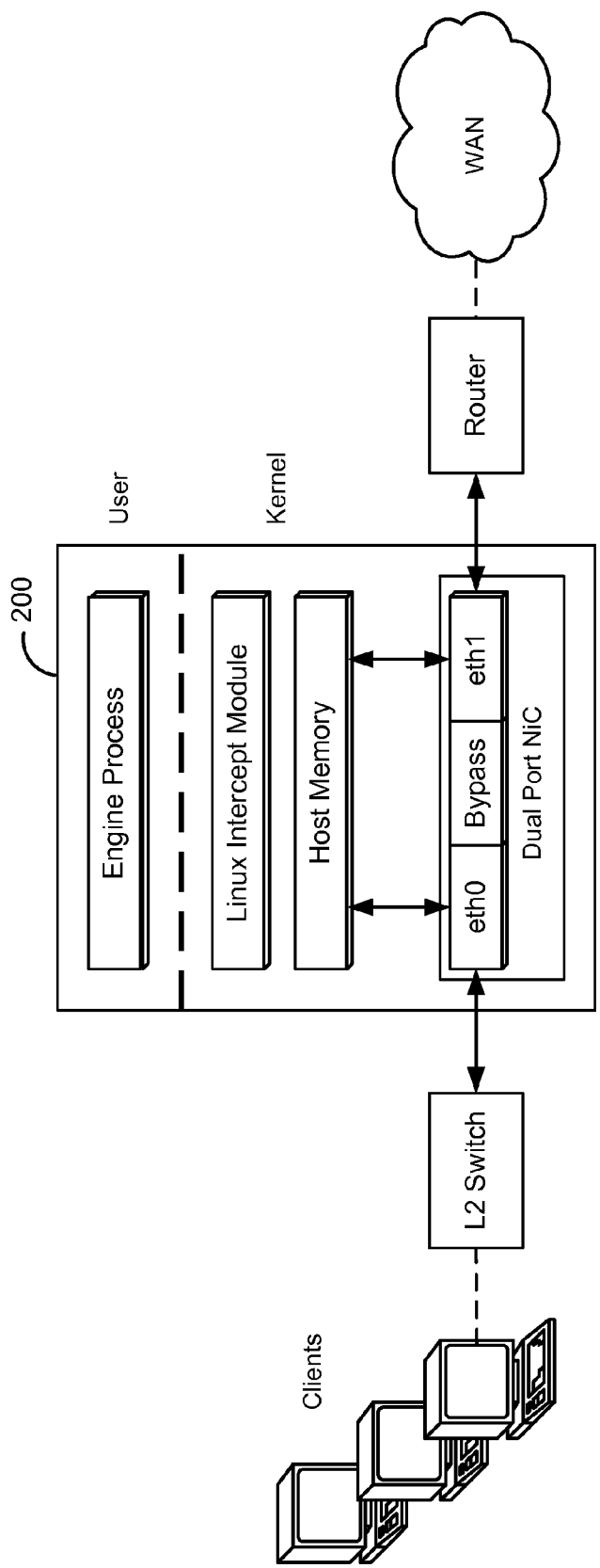
FIG. 4 is a schematic diagram of an acceleration engine.

An engine may connect to a network with one or more network interfaces. When acting transparently and intercepting connections transparently, the engine could include two network interfaces. Alternatively, an engine could utilize a dual-port network interface so that the device could be inserted transparently into a network. One such configuration is to insert the device between a layer-2 switch and a router and function as an link-layer relay or bridge between said switch and said router, as illustrated by engine 200 in FIG. 4. Some dual-port network interfaces include physical bypass circuits with watchdog timers that fail-over when the device malfunctions. Using a dual-ported network interface, all traffic processed by the engine can thus be intercepted and delivered to a local proxy process running on the device, e.g., using the techniques described in McCanne IV. Likewise, any traffic that need not be processed by the engine can be simply forwarded from one interface to the other unmodified.

Variations of the engine might offer a range of different capabilities and hardware mixes. A low-end branch office device might be a single-CPU, 1U device with low-cost internal ATA disks. Datacenter devices might have higher-performance, multi-way CPUs with an option for external storage attachment, e.g., via FiberChannel or iSCSI. Some variants of the engine can be packaged as blades in a blade server or as software that could be installed on a client desktop or integrated into application server software.

In one specific implementation, a system employs an event-driven programming model that is SMP capable and is written in portable C++. The programming model is event-based with threads hidden behind the event model, providing the concurrency mechanism needed to benefit from SMP-equipped configurations.

Engine 200 might comprise a set of interdependent software modules: (1) a core data processing module that runs as a user-level process, handling connection processing and implementing the segment cloning and/or transaction prediction, (2) a set of user-level processes that handle administrative tasks such as on-line configuration, monitoring, watchdog capabilities, etc., and (3) a kernel module that provides the hooks to transparently intercept client-server connections.

A password-protected Web server might provide GUI-based administrative access to engine 200, including an assortment of configuration, monitoring, and logging capabilities. A command-line interface (CLI) might be accessible via ssh. The CLI includes a set of logging capabilities that can selectively enable log capture of many difference aspects of the running system. An SNMP agent also runs on the box and supports a queryable MIB as well as a set of simple traps. The Web server UI, the SNMP agent, and the CLI processes all communicate with the core engine process via a local RPC interface (as well as shared memory, in some cases). A device's configuration can be stored in a single XML configuration file. These configuration files can be exported from and imported into the device via the CLI, admitting a model where centralized scripts can be developed (by the customer, an integrator, or consulting services) to control and/or configure large numbers of boxes from a central location.

Connection Creation

In a number of the examples herein, a client-side engine interact with a server-side engine where the two engines are assumed to know about each other and to be in network proximity with the client or server for which the engines are supporting a transaction. In McCanne IV, techniques that engines could use to find other engines in a path between a client and server might be techniques that are used for the two engines to find each other. Alternatively, other techniques might be used, such as explicit maintenance of a set of pointers in each engine by an administrator.

For example, a mapping from a destination server address to its nearest engine might be maintained in a table at the client-side engine. This table could be configured by the operator using explicit knowledge of the deployment. However, while such manual configuration provides a great deal of flexibility, it also burdens the operator not only with a fairly complicated setup process, but also requires constant maintenance of these tables as the server and network infrastructure evolve. A better approach is to discover the mapping automatically, as the system taught in McCanne IV allows.

Session Flow and Multiplexing

Figure 5:
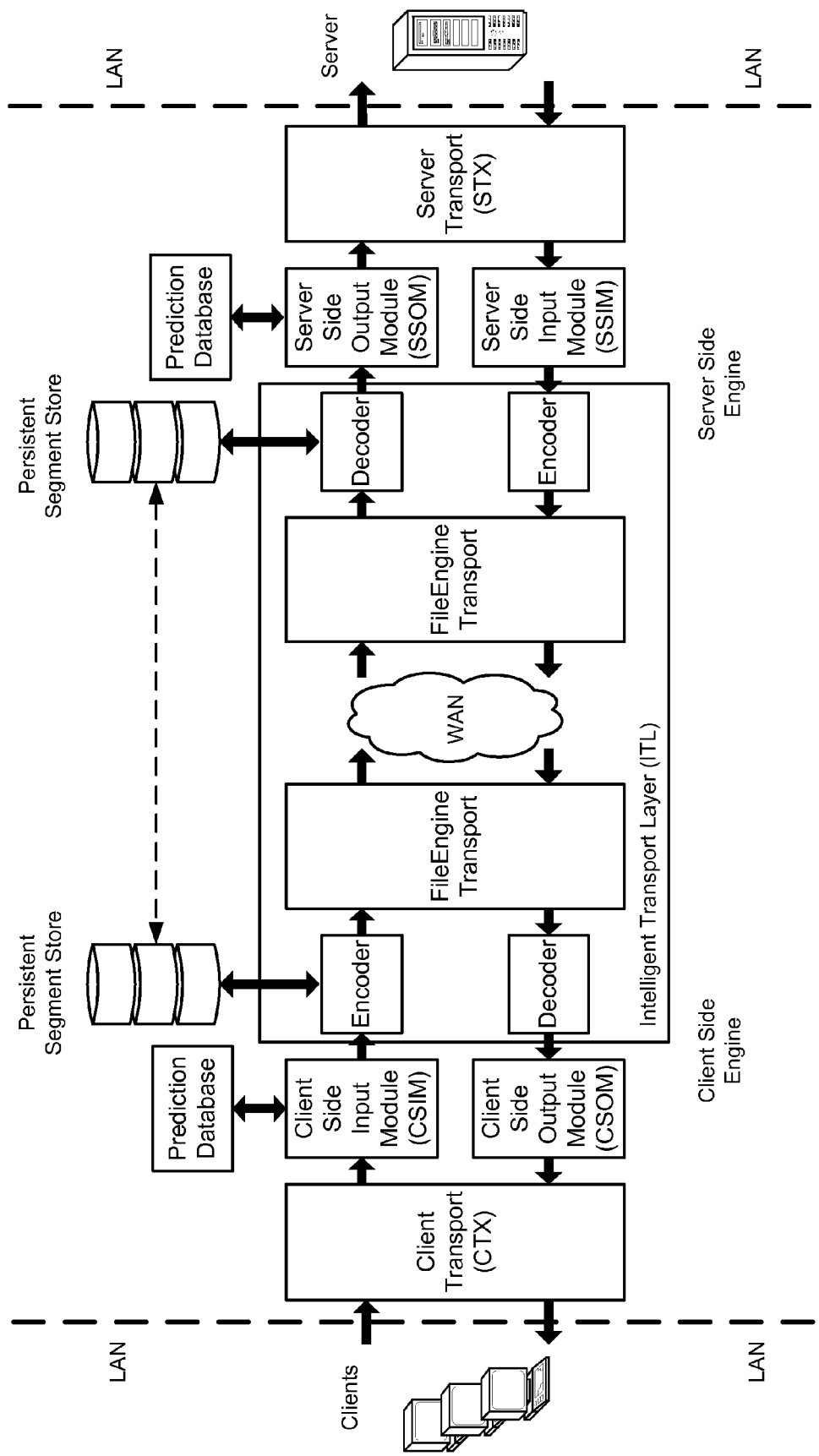
FIG. 5 is a schematic diagram of a network path between a client and a server including a pair of acceleration engines separated by a network with WAN-like characteristics, wherein the acceleration engines include transaction prediction and segment cloning.

Once an engine or pair of engines intercepts a client-server connection using the techniques described in McCanne IV (or any other technique), various modules in the engine are engaged to manage the flow of data to and from the clients and servers and into and out of the optimization stages within the engine. FIG. 5 illustrates a processing pipeline whereby a client and server connection has been successfully intercepted. Once intercepted, the client communicates directly with a client transport module (CTX) in the client-side engine and the server communicates directly with the server transport module (STX) in the server-side engine. Presuming the engine utilizes network address translation (NAT) as described in McCanne IV, then even though the client is communicating with the engine over a TCP connection terminated at the CTX, it instead believes it is communicating directly with the server. Similarly, the server believes it is communicating directly with the client.

It is also possible for the server to connect to the server-side engine IP address rather than the NAT'd client address when the server-side engine is not directly in path, but this discussion assumes transparent operation at both the client and server sites. The CTX and STX modules can handle all communication with outside clients and servers including connection management, flow control, buffering, and so forth.

For each incoming stream (of TCP segments or UDP datagrams or variations thereof), the Client-Side Input Module (CSIM) performs protocol-specific processing, e.g., performing transaction prediction and providing certain key hints to the segment cloning layer to improve overall performance. Once the CSIM decides that a client request (either synthetic or actual) should be forwarded toward the server, it passes it on to the Intelligent Transport Layer (ITL), which employs segment cloning to transform the request into a thin transaction envelope (described below). Of course, where transaction prediction is used but segment cloning is not used, that transformation would not occur. The Encoder and Decoder modules implement the segment cloning scheme by processing their input against the persistent segment store and implementing the necessary protocol machinery to ensure that segments are properly transmitted and distributed.

The transaction envelope is in turn handed to the engine Transport Multiplexer (TMUX), which transmits the message to the appropriate server-side engine. Once there, the server-side TMUX delivers the request to the Server-Side Output Module (SSOM), which processes the request and relays it, perhaps after modification. The STX, in turn, handles communication with the origin server. The data flow in the opposite direction, from server to client, is analogous.

In many possible embodiments, the TMUX implements a virtual connection layer wherein multiple transport connections are multiplexed over a single physical transport connection between pairs of engines. This layer provides a set of services analogous to the UNIX™ socket interface: connection setup and teardown, multiplexing of channels, reliable transport, etc. It also provides the foundation for implementing bandwidth policies so that the device may be configured with an aggregate rate limit by the operator.

In these embodiments, the TMUX transport multiplexes all traffic (between a given pair of engines) over a single transport connection. As such, this connection, while typically based on TCP, could be instead based on other types of reliable transport protocols where customer environments would benefit. For example, the TMUX TCP transport could be modified with extensions to support high-speed TCP for Large Congestion Windows (as described in Internet Draft draft-floyd-tcp-highspeed-02.txt, February 2003). This would allow customers who have purchased high-speed WAN links (e.g., OC-3's) to fully utilize them even with legacy applications that deploy legacy TCP implementations. As described above, just doing this could have a dramatic impact on wide-area network performance. By leveraging engines as an intermediary between existing clients and servers, no forklift upgrade is required to touch every end-host's legacy TCP stack.

In other embodiments, the TMUX transport distributes network data across multiple, parallel transport connections. For example, large amounts of data from a single client-server connection could be striped across multiple TCP connections to provide increased throughput compared to using a single TCP connection.

One approach for implementing the TMUX module is to add a virtual connection header to each message that flows from a CSIM to an SSIM and vice versa. The virtual connection header contains a connection identifier that uniquely determines the CSIM/SSIM pair on both ends of the multiplexed communication channel. This abstraction allows multiple CSIMs to send messages to their respective SSIMs and in turn relay the messages to/from the appropriate servers (and vice versa).

The client/server-side input/output modules can perform needed protocol specific optimizations. In particular, the client-side modules and server-side modules work in concert to implement transaction prediction, as some predictions are more appropriately carried out at the client end while others are more suited to the server end. In addition, the modules can communicate with one another out of band and coordinate their actions in a way that optimizes the overall performance outcome.

Transaction Prediction

Even with segment cloning and other techniques to reduce bandwidth usage, network links still would have an inherent latency imposed by the speed of light, which can have a dramatic impact on overall client-server throughput and performance as described above. This latency can be addressed by transaction prediction using the engines described herein.

In most of these examples, a pair of engines is assumed. However, as explained the later below, it is possible to perform the transaction prediction described herein using a single engine, if paired segment cloning is not done.

An engine attempts to anticipate client behaviors before they occur and execute predicted transactions ahead of client activity. Once the client actually issues the predicted transaction, the transaction results can be immediately produced without incurring a wide-area round trip.

Predicting transactions is quite different than caching. With caching, a cache maintains a store of data that represents data objects such as files, file blocks, Web pages, email messages, etc. where the cached data is a copy of all or part of the data object being cached. Those copies must be exact, i.e., a cache must be able to detect when its data no longer matches the official copy of the object (cache consistency) and determine how long to keep what data copies. A cache needs to maintain its store and implement server-like protocol machinery to serve client requests for the cached data objects. Likewise, a cache must implement client-like protocol machinery to issue requests to the server for data that is missing from its cache. While building a store of such objects is straightforward, keeping that store coherent with the original copy in the midst of multiple clients accessing and modifying the objects, with security protocols, locking mechanisms, and so forth all create a complex, difficult to manage architecture.

Transaction prediction, on the other hand, avoids the complexities of coherency by logically sending transactions back to the server.

Unlike a cache, an engine that does transaction prediction only needs partial protocol knowledge to know when and if it is safe to perform various optimizations and does not require server or client mechanisms embedded in the system. Another distinction is that caches generally need to maintain their data stores much longer than a predicted transaction's results are maintained, making consistency control much simpler while providing benefits that a caching system might provide.

Figure 6:
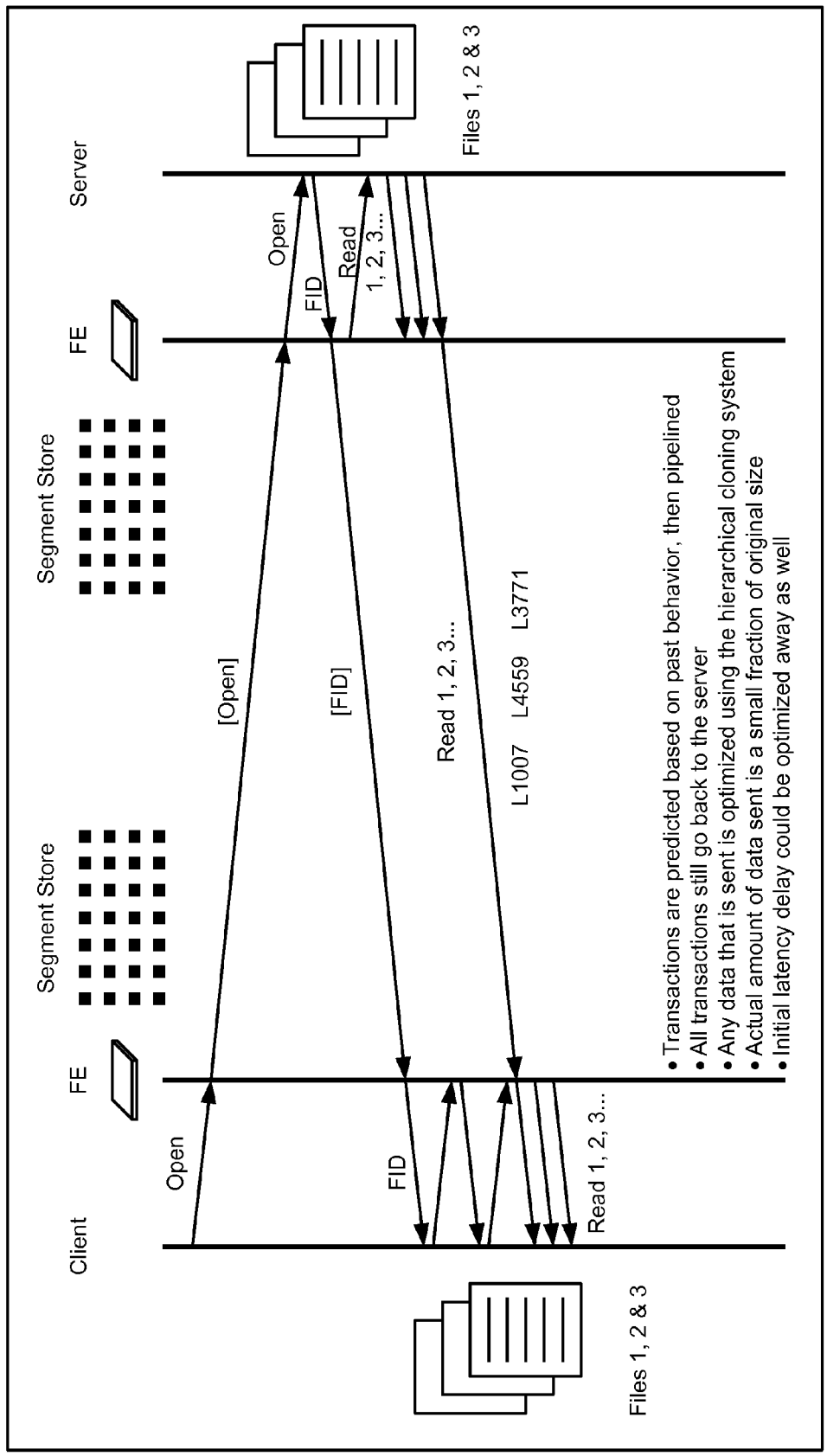
FIG. 6 is a swim diagram illustrating a transaction acceleration process including predicted transactions.

FIG. 6 illustrates, by a simple example, transaction prediction. The swim diagram in FIG. 6 represents the interactions for one instance of a client opening a file and sequentially reading all the blocks of that file. In this example, the "open" request flows across the network through the engines (client-side engine and server-side engine) and ultimately to the origin file server. The server responds with an "open" response. Upon receiving the "open" response from the server, the server-side engine is in a position to consult its database of past client behaviors and decide, for example, that the file being opened (perhaps in the context defined by earlier transactions) is always sequentially read and closed. Thus, the server-side engine can predict that the next transactions will be requests from the client for blocks of the file, requested sequentially. Once the server-side engine that makes that prediction, it can inject synthetically produced read requests into the client's session such that the server would receive those requests as if the client sent them and respond accordingly. The server-side engine might further note that once the blocks have been retrieved and passed through the segment cloning subsystem, the resulting transmission to the client-side engine would require less than a hundred bytes to convey more than a megabyte of data (as an example) and use that observation to schedule transmission of the results of the synthetic read requests to the client-side engine with awareness that the transmission would have virtually no impact on the network.

Unlike this very simple minded read-ahead model, transaction prediction can be done with many other types of client-server based software operating over a WAN. For example, referring to the example sequence shown in FIG. 8, even though the read-ahead is very effective at eliminating wide-area round trips, there is still a round-trip associated with the initial open. In fact, this initial round-trip can also be eliminated by the engine when an access to one particular file can predict an access to another file. For example, there may be some earlier transaction that causes the engine to send a synthetic open for the file in question (perhaps doing the read-ahead as well) so that all round-trips are completely eliminated. This results in LAN-like performance even though every transaction is served remotely.

With a cache, the operating system at a client (or an agent in a network cache) would pre-fetch file data into a cache and serve that cached data to local clients from the cache thereby avoiding a round-trip to the origin server for each such read from the cache. This approach creates a difficulty in interfacing the cache with access control and security mechanisms in a file system. When a client opens a file for data that has been cached, the cache must invoke all the mechanisms that a server would invoke to ensure that the client has permission to read the data from the cache. With transaction prediction, however, this complexity can be avoided because client requests are not served from a cache but instead, client requests are predicted and injected into the client's active session so interaction between the client and the server can have precisely the same access semantics as if the client were communicating directly with the server.

Engines doing transaction prediction can make fairly deep predictions about the set of future transactions that are likely to occur by computing the maximum likelihood path through the Markov chain described later, or using one of many other methods for predicting client behavior. With caching, savings does not come until the cache is filled or partially filled with copies of data objects that can be served up, so first requests to a cache are always slow. With transaction prediction, requests might be anticipated at any time.

However, aggressive pre-fetching can end up wasting precious bandwidth resources on data that the client never uses, so pre-fetching ends up reducing rather than improving the client's performance and as a result, many predictive pre-fetching schemes are very conservative. However, using transaction prediction in combination with a bandwidth saving technique such as segment cloning, predictions can be fairly aggressive, as a little bandwidth is needed to respond to predictions.

As described above, predicted transactions can be used to inject synthetic requests for a data ahead of the actual transaction. Additional examples of how an engine might predict a transaction will now be described below.

Prediction System

As transactions are executed between the client and server, intervening engines intercept a transaction, use a transaction predictor that compares the intercepted transaction to a database of past transaction behaviors to make decisions about the probability of future events. A learning algorithm can be implemented to summarize past transactions into state that is maintained and updated in the database. This "prediction data base" (PDB) could be stored in engine itself, in the engine's RAM, on its disk, or across both the RAM and disk. In other embodiments, the PDB could be stored external to the engine, e.g., on a database server, whereby the engine would communicate with said database via query and update protocols.

A transaction predictor might be integrated with an engine, such that each engine has its own transaction predictor, but other implementations might have transaction predictors that are separate from the engines and not require one-to-one correspondence. In one embodiment of a transaction predictor, the transaction predictor maintains a database of transaction patterns that are patterned using a Markov chain model.

Certain sentinel transactions (such as "file open") represent a state in a low-order Markov model and estimates of the state transition probabilities are maintained by keeping track of the number of times each edge in the Markov chain is traversed. Over time, as more transactions are observed, transition probabilities are improved and the confidence levels increase. For transactions that are not amenable to prediction, confidence levels never increase, which informs the transaction predictor to be less aggressive in such cases.

Different types of information can be attached to each state (e.g., to remember that in a certain state a file is read sequentially). By computing maximum likelihood path through the Markov chain given the current state, fairly deep predictions can be made about the set of future transactions that are likely to occur, allowing the transaction predictor to anticipate client activity several transactions before it actually occurs.

Based on this Markov model, if a transaction predictor determines that there is a very high likelihood of a future transaction occurring, it may decide to go ahead and perform that transaction rather than wait for the response from the server to propagate back to the client and then back to the server. The performance improvement in this scenario comes from the time saved by not waiting for each serial transaction to arrive prior to making the next request. Instead, the transactions can be pipelined one right after the other.

Predicted transactions are preferably only executed ahead of the client's actual transaction when it is safe to do so. To this end, transaction predictors might be designed with enough knowledge of the underlying protocols (e.g., CIFS oplocks, etc) to know precisely when and if it is safe to do so. In cases where such predictions are unsafe, the transactions are simply relayed back to the origin server and the benefit of transaction is lost in these rare cases. Fortunately, a wide range of important applications turn out to have very predictable behaviors and, as a consequence, transaction prediction can enhance performance significantly.

Transaction Predictor Components

Figure 7:
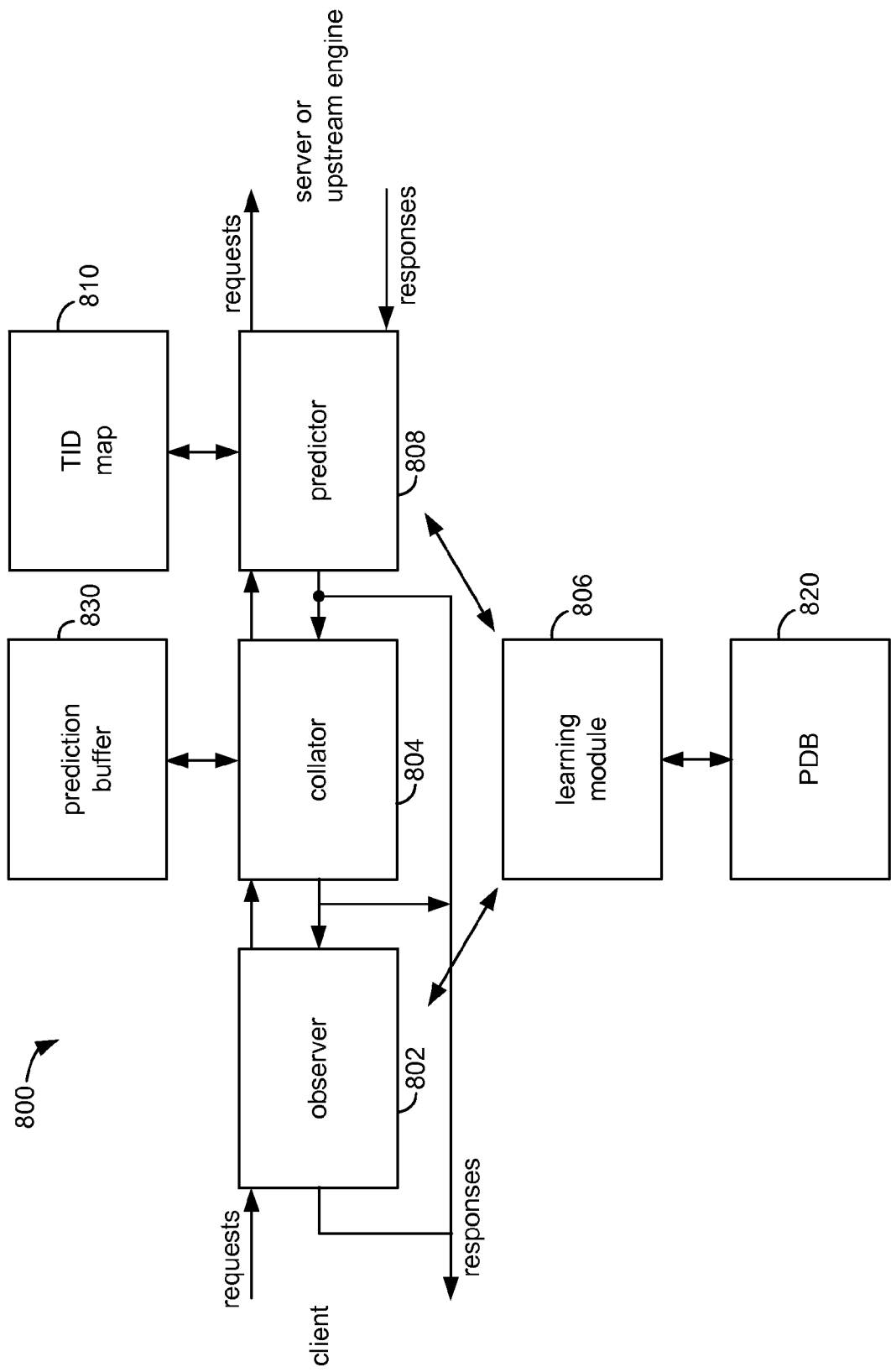
FIG. 7 is a block diagram of one possible arrangement of a transaction predictor.

FIG. 7 illustrates one possible arrangement of components in a transaction predictor 800. These components represent modules that comprise the higher-level CSIM and SSIM entities illustrated in FIG. 5. As shown in FIG. 7, transaction predictor 800 comprises an observer module 802, a collator module 804, a learning module 806, a predictor module 808, and a transaction ID mapping table 810. A persistent prediction database 820 is also shown. In this example, persistent prediction database 820 is part of learning module 806 and prediction buffer 830 is part of collator module 804.

In one variation of the transaction predictor, one instance of each of the modules is invoked for client-server session or transaction stream, except that learning module 806 (and prediction database 820) operates over all sessions and streams for a global view. When a new client-server session is established, the per-session modules are allocated to manage the data flow and perform transaction predictions. When a client-server session terminates, the per-session modules are simply freed up and all data in any predicted requests that remains is discarded. The knowledge inferred from observations of transactions patterns is stored persistently in the global learning module 806, which persists across sessions.

A collection of modules situated in an engine near the server may cooperate with another collection of modules situated in an engine near the client to perform cooperative transaction prediction. For example, the transaction predictor at the server-side engine may execute predicted transactions and transmit the predicted result over the network to the transaction predictor at the client-side engine. In another variation, the client-side engine may compute the set of predicted transactions that should be performed, communicate this information to the server-side engine to execute the predicted transactions and return the results with optional modifications or based on certain conditions.

These interdependent components of a transaction predictor take one approach to transaction prediction by monitoring client transaction patterns, injecting predicted transactions into the client-server communication stream, and collating predicted results with future client requests. In other embodiments, fewer modules might be present or additional modules might be present.

Request-response protocols typically use transaction identifiers (TIDs) and those are useful in transaction prediction. TIDs provide clients with an easy way to match responses with requests, and request-response protocols typically include some form of a TID in the header of each request and response message. When responding to a request, the server may copy the TID into the response message. The use of TIDs allows messages to be processed out of order and/or in parallel while simultaneously allowing the client to relate each response back the request it had originally issued.

When performing transaction prediction, the transaction predictor generates a TID to attach to each predicted transaction that is preferably distinct from any TID from any actual client-generated transaction TID. If the transaction predictor chooses a TID that conflicts with a TID for a client-generated transaction that is pending, the engine might erroneously match the response for the client-generated transaction with the request from the predicted transaction. Likewise, if the client chooses a TIED that happens to have been used by a predicted transaction that is pending, then the responses can likewise be confused. To avoid these problems, the transaction predictor preferably tracks the TIDs of client-generated requests and ensures that conflicts do not arise. One method for accomplishing this is to map all requests onto new TIDs that are guaranteed not to collide. This mapping can be maintained in a table so that when the corresponding response arrives from the server, the TID can be mapped back to its original value. Each entry in the table could store an indication of whether the request was originally generated by the client or was synthetically generated by the transaction predictor as part of transaction prediction.

Observer module 802 monitors the stream of transactions and attempts to "learn" the patterns of transactions by storing certain modeling information in the persistent prediction database 820. To this end, when a client transmits a request, observer module 802 receives the request and updates learning module 806 with whatever information is required for the particular learning algorithm that is in effect. Many different approaches for the learning algorithms are possible. Some of these approaches are described herein in later sections.

Collator module 804 receives the request from observer module 802 once server module 802 finishes its processing. Collator module 804 consults the prediction buffer 830 tied to the client session associated with the request portion of the transaction currently being handled to see if the transaction has been predicted. The result may or may not be present, as the request might still be in transit between the client and the server. If the transaction had been predicted, then it is not sent to the server. Instead, if the response is present in the prediction buffer, then that result is returned. If the result is not present, then the request is stored in collator module 804 to wait for the response that is in transit.

When a response arrives, predictor module 808 intercepts the response and queries transaction ID mapping table 810 using the transaction ID from the response to determine if the response was the result of a predicted transaction or of a normal client request. In the latter case, the response is simply forwarded to the client. In the former case, the response is stored in the prediction buffer for that transaction ID in anticipation of the corresponding request from the client. When the result is stored in this fashion, the transaction predictor also checks for a waiting request in collator module 804. If a corresponding waiting request is present in collator module 804, then the response is matched against that waiting request and sent on the client (after modifying the TID to match the TID used by the client in the successfully predicted transaction).

If a request for the predicted response does not occur within a prescribed amount of time, the response may be dropped from the prediction buffer. If such a request does arrive for the predicted response, then the predicted result is returned to the client (after modifying the TID to match the TID used by the client) and the response is removed from the prediction buffer.

To further enhance the benefits of prediction, predictor module 808 may decide, based on measurements or inherent knowledge of the underlying protocol and/or application, that the predicted transaction might be used again later. In this case, rather than delete the predicted response from the prediction buffer altogether, it can predict that the same response may be needed and transmit an identical synthetic request to the server. Based on inherent knowledge of the underlying protocol and/or application, if the predictor can further deduce that the result will be the same, then the value could be immediately re-saved into the prediction buffer rather than waiting for the response from the server.

While the description of a transaction predictor describes how predicted transactions can be synthetically injected into a client-server session and how responses can be collated with actual client requests, these operations are described independently of how particular transactions might be predicted. The particular decisions about which transactions can be predicted and the particular predicted transactions can be determined in a modularized fashion. Different prediction mechanisms can be employed within such a module to provide different tradeoffs in terms of implementation overheads (storage, computation, etc.) versus the overall efficacy of the process.

Several approaches to predicting transactions are described herein. One approach involves the use of a static model based on configured logic. Another approach involves the use of a dynamic model based a learning algorithm that observes past client-server transaction patterns to anticipate and predict future transactions. There are many such approaches and only a few are disclosed herein. It should be clear to one skilled in the art, provided the disclosure herein, how to integrate other learning models into the transaction predictor's and/or acceleration engines described herein.

Static Prediction: Protocol-specific Rules

One approach to transaction prediction is to encode static logic into the transaction predictor that recognizes common transaction patterns and performs prediction accordingly. This approach can be thought of as programming the transaction predictor with a set of "recipes". Each recipe represents a pattern or set of patterns that are to be recognized along with a set of predicted actions that can be taken on behalf of the recognized pattern. These recipes would typically be protocol and/or application dependent. For example, in the context of a file system, one recipe could be to recognize open-file requests that include "read access" to cause certain file reads to be performed. Similarly, an open request could cause a certain type of "stat" operation to always be predicted since a stat is an inexpensive operation compared to the large round-trip associated with performing the operation across a WAN.

Alternatively, a recipe could be more complex. For example, certain specific patterns of file-system behavior could be matched against a database of static patterns that identify certain applications. Put another way, when a certain pattern is encountered, the transaction predictor can conclude with high probability that a certain application is in fact the client program (otherwise, at the network file system level there is no knowledge of what application is invoking the file system protocol). Once the transaction predictor knows what application is running, then it can perform various optimizations that have been statically configured into the system that will benefit the particular application that is running.

Dynamic Prediction: A Markovian Learning Module

While static prediction can be very effective at anticipating client protocol behaviors, and even more powerful approach is to rely on dynamic prediction logic, which employs a learning algorithm to leverage past client behaviors to predict present and future transactions.

One approach to the learning algorithm is to adopt a "literal" model, where every transaction is recorded in a data structure that models pair-wise relationships between subsequent transactions. Transaction prediction works by modeling client-server transactions as a sequence of requests from one or more clients and attempts to predict future requests from the present and past observed requests (and optionally responses). In one embodiment of the literal model, each request is explicitly represented by a state in an Nth-order Markov model. As requests are observed, states are added to the Markov model and transition problems updated between the states. For the purposes of discussion, let the sequence of observed client requests be denoted as $\{U_1, U_2, \ldots\}$ and the sequence of observed server responses be denoted as $\{V_1, V_2, \ldots\}$.

Each particular request Uk comprises an operation code ("opcode") and one or more parameters, i.e., Uk=(opcode, p1, p2, ... pM). The corresponding server response typically comprises one or more values (often including an error status that can also be viewed as a special type of value), i.e., Vk=(v1, v2, ... vN). Note that a value can be any of a number of common data types, e.g., from a simple integer result to a large buffer of data. As described above, in many client-server protocols, the request includes a TID, which is copied into the server response so the client can collate the responses to pending requests to allow for multiple outstanding requests and/or message reordering.

For example, a file open request might comprise an opcode for "file open", a file name, and an access mode (e.g., read, write, etc), e.g., Uk=(OPEN, "/a/b/c.txt", RD_ONLY).

Figure 8:
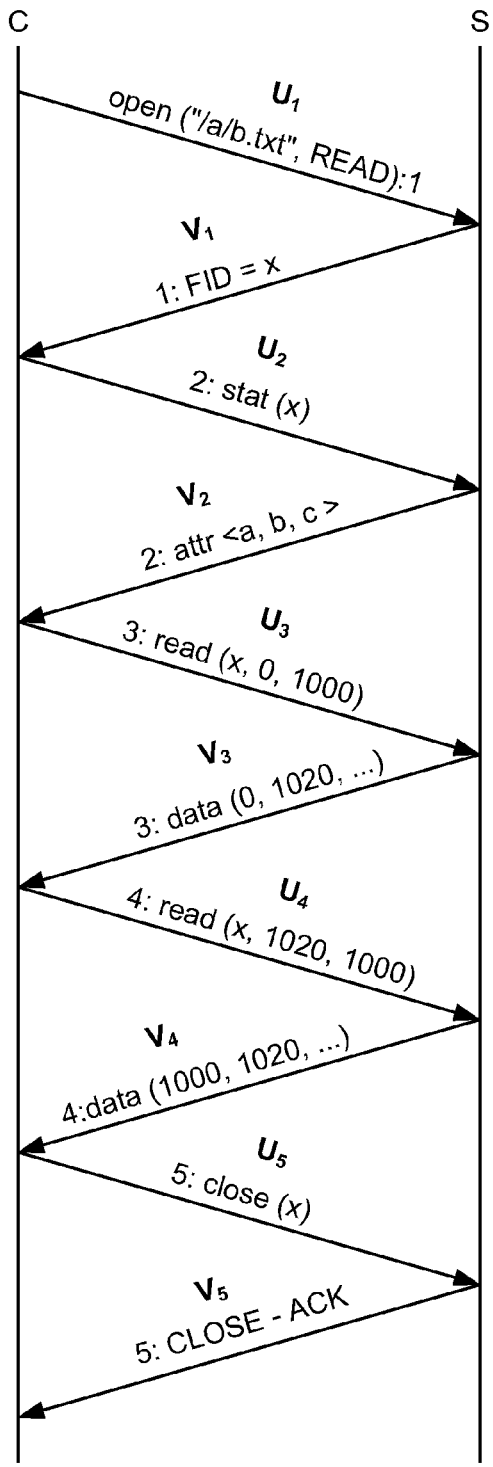
FIG. 8 is a swim diagram of a conventional set of transactions, including a file open, followed by a stat request, read requests and close requests.

FIG. 8 depicts a set of transactions between a client and server that would be modeled by the prediction system. This example is illustrative of a network file system protocol such as CIFS or NFS. Each transaction request and response is labeled $U_1$, $V_1$, etc. using the terminology defined above. Similarly, a TID is prepended to each request and response. In this example, the client opens a file for read access ($U_1$), and the server responds with a file handle to be used in subsequent operations on the file ($V_1$). Then, the client issues a "stat" call to retrieve various attributes about the file ($U_2$), which the server returns ($V_2$). Then, the client reads the first 1000 bytes of the file ($U_3$), which the server returns ($V_3$). Likewise, it reads the next 1000 bytes ($U_3$, $V_3$). Finally, the client closes the file ($U_4$), and the server acknowledges the operation ($V_4$).

Figure 9:
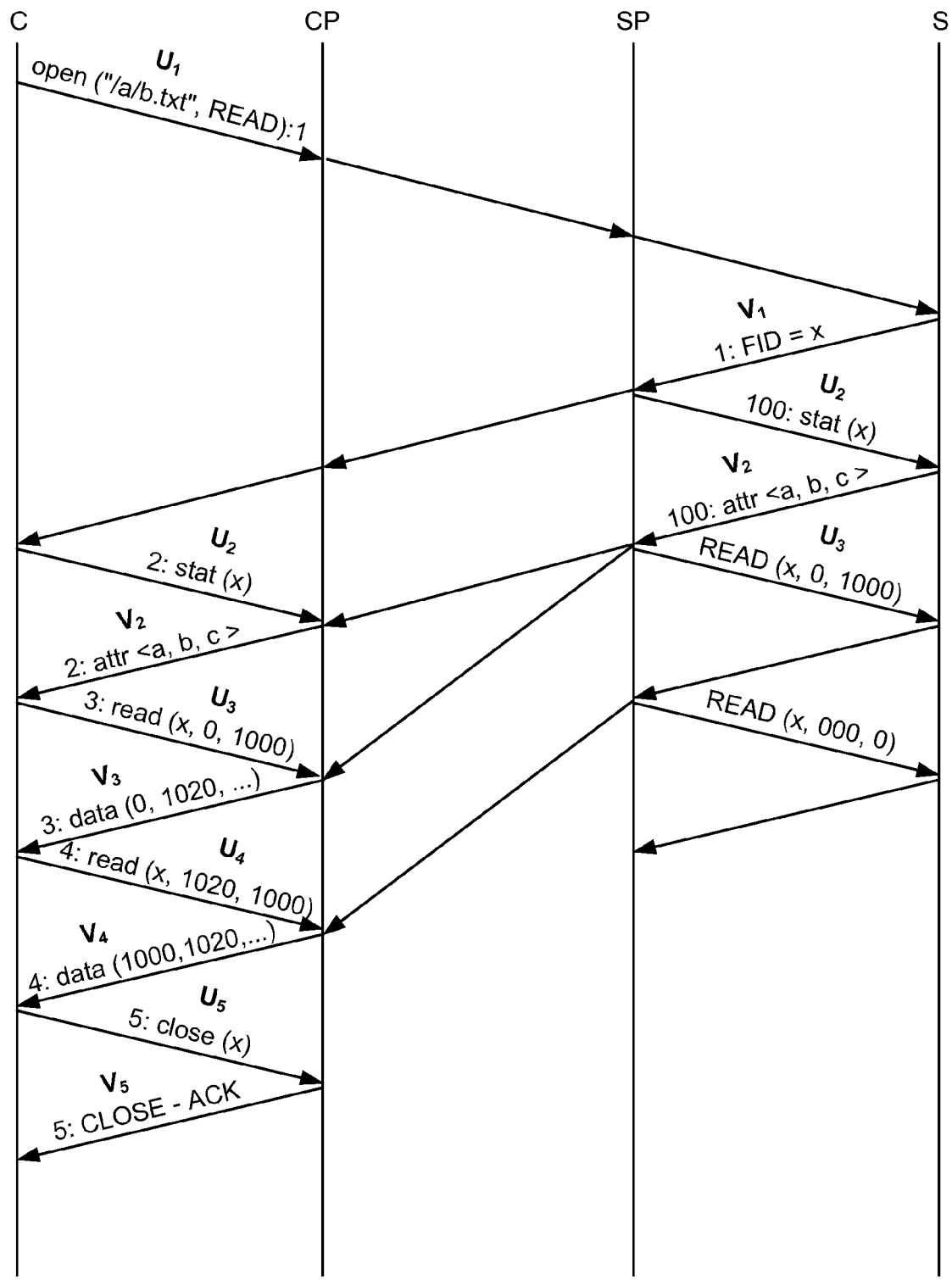
FIG. 9 is a swim diagram of the requests shown in FIG. 8, with transaction prediction used to accelerate the requests.

FIG. 9 shows how the example transaction sequence of FIG. 8 might be optimized across a WAN using transaction prediction. Here, the transactions flow through two engines, one near the client and one near the server. When the open response arrives at the server-side engine (V1), prediction can occur because the file is opened and the file handle is available. Presuming the learning algorithm has gathered sufficient information, predicted requests can be executed against the open file. In this example, the predictor at the server-side engine generates requests $U_2$, $U_3$, etc. and relays the predicted results $V_2$, $V_3$, etc. across the network to the client-side predictor module. When the client issues the actual requests ($U_{10}$, $U_{11}$, etc.), the client-side engine maps the TIDs of the predicted results to the TIDs that the client used and returns the result, thereby eliminating many wide-area round trips.

Figure 10:
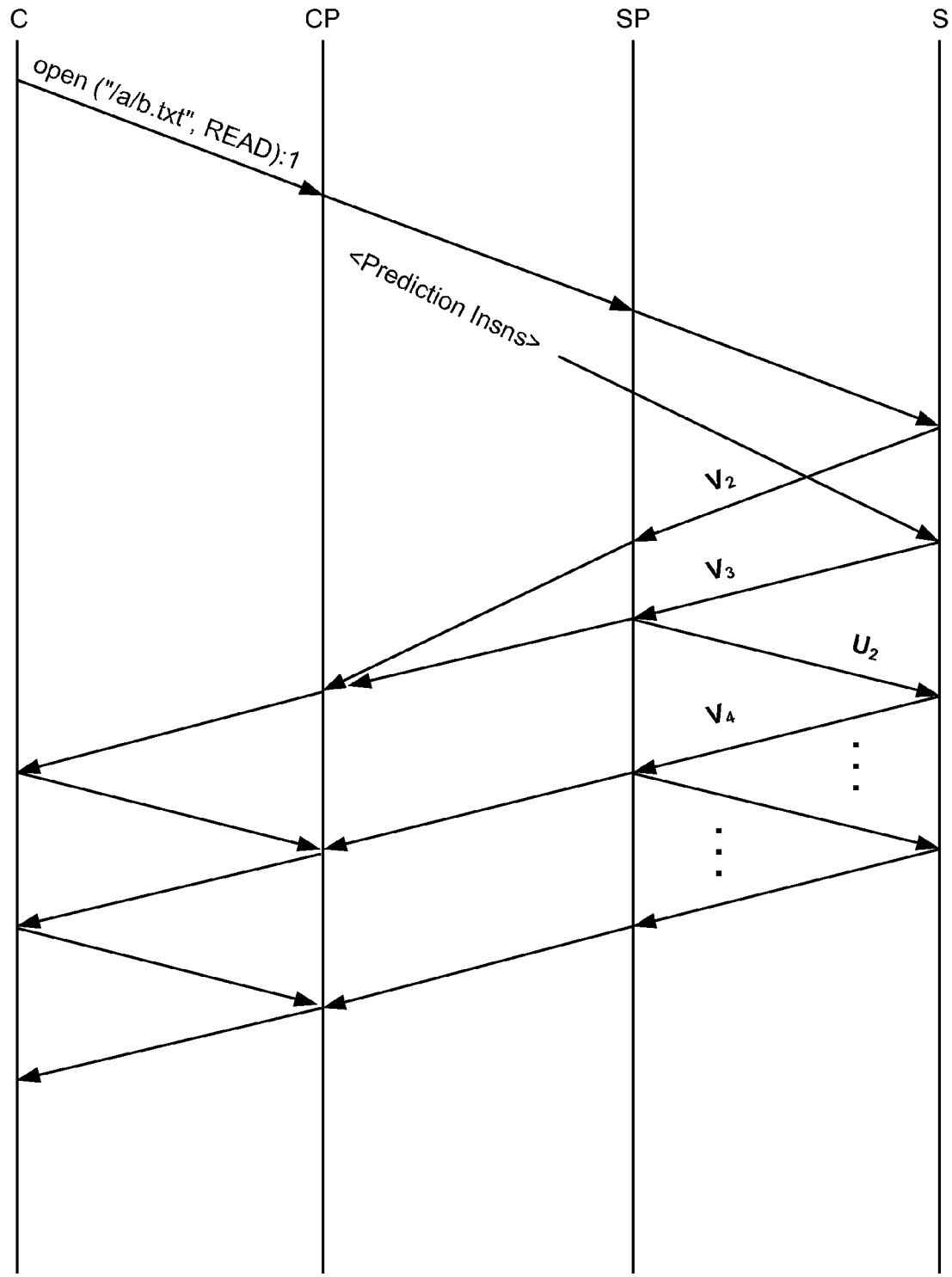
FIG. 10 is a swim diagram illustrating transaction prediction performed at the client side of an engine pair.

FIG. 10 illustrates another approach. There, the client-side engine determines what predictions are to be carried out and sends a message summarizing those predictions to the server-side engine. At this point, because the client-side engine does not have the file handle corresponding to the open file, it cannot send the actual predicted transactions verbatim, but instead sends a template of the predicted transactions that the server-side engine executes against. This template can be implemented in a number of ways including a scripting language, a byte code program for a virtual machine, or a template definition that defines a data structure that can be interpreted by the server-side engine.

Building the PDB

In one embodiment of the present invention, the Markov model managed by learning module 806 is stored the persistent prediction database (PDB). PDB 820 contains a set of "states" and a set of "edges". Each state represents a single request (i.e., an opcode and literal parameters), or in higher-order Markov models, could actually represent a fixed-length sequence of requests. An "edge" represents a predictive relationship between states. In different embodiments of transaction predictors, an edge may represent different aspects of correlation between subsequent transactions. To develop the model, suppose Si and Sj are two states representing requests Ui and Uj. Then, some example schemes for mapping transaction sequences onto states and edges in the Markov model are as follows:

Scheme 1. Whenever a request Uj follows Ui in exact sequence in one or more observed client-server transaction streams, then there is an edge (Si, Sj) in the PDB.

Scheme 2. Whenever a request Uj follows Ui with at most W intervening transactions then there is an edge (Si, Sj) in the PDB. With this scheme, one transaction may predict another even if intervening transactions exist.

Scheme 3. Each state has a limited number of edges, say N, originating from it. Whenever a request Uj follows Ui in exact sequence in one or more observed client-server transaction streams, then an edge (Si, Sj) is added to the PDB. If the number of edges emanating from Si exceeds N, then the least recently referenced such edge is removed from the PDB. This not only limits the amount of storage required for the PDB, but it can also improve the system's speed of adaptation.

Figure 11A:
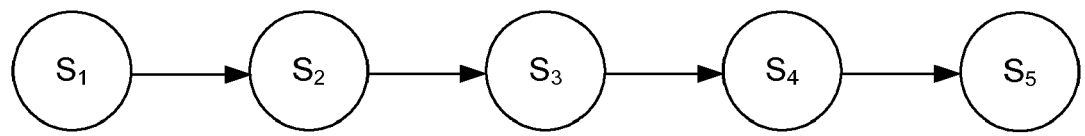
FIG. 11A illustrates a first scheme for modeling and FIG. 11B illustrates a second scheme for modeling.
Figure 11B:
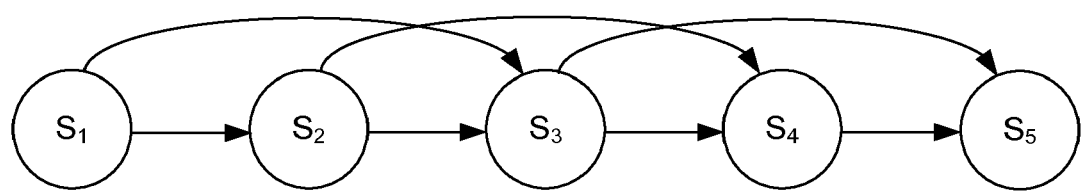

FIGS. 11A and 11B respectively illustrate Markov models representing Scheme 1 and Scheme 2, where W=2. In this example, if the transaction predictor happens to see $U_3$ (represented by $S_3$), then it can conclude with high probability that $U_4$ (represented by $S_4$) will occur next.

Each edge represents the Markov relationships between two states, and as such, is tagged with an estimate of the transition probability between those two states. That is if the sequence of states is defined as the random process $S(0)$, $S(1)$, ... and the current state $S(k)=u$, then the transition probability that the next state $S(k+1)$ is some other state v, is $P(S(k+1)=v|S(k)=u)$, which for a first-order Markov model is equal to $P(S(k+1)=s|S(k), S(k-1), \ldots S(0))$. This important property allows for the modeling of predictions by keeping just one state per possible transaction. There is a tradeoff here, however, in that the underlying transaction patterns are not necessarily well-modeled with a first-order Markov model (which says the transition probabilities depend only on the current transaction and not on past transactions). Thus, in exchange for a higher degree of implementation complexity, the present invention embodies higher order Markov chains. For example, in a second-order model, each state would represent two adjacent transactions so that the transition probability would be dependent on the current transaction and previous transaction (yet remain independent of all prior transactions).

To compute the Markov chain transition probabilities, learning module 806 observes a stream of client requests and might maintain PDB 820 as follows. In this explanation, a first-order Markov model is assumed but it would be obvious to one skilled in the art from this description how to extend this to higher-order Markov models. Associated with each edge is a count of how many times it has been logically traversed (i.e., how many times the two transactions represented by the head and tail of the edge have been encountered adjacent to each other). For each new transaction encountered, the set of edges that are logically traversed by the observation are computed and the edge counts are updated according to the definition of the edge (as outlined in the various schemes defined above). Then the probability of each edge emanating from a particular state can be computed as that edge's count divided by sum of all the edges' counts emanating from that state.

Figure 12:
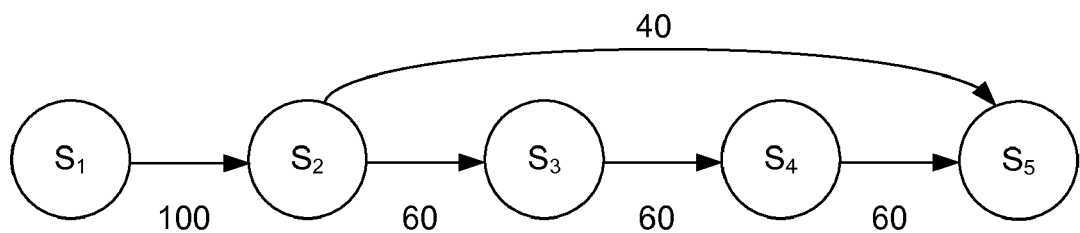
FIG. 12 illustrates a state diagram for a Markov model used for transaction prediction including edge counts.

FIG. 12 illustrates how edge counts can be used to make predictions. Given the example of FIG. 8, assume 100 accesses to the file in question, wherein the transaction sequence from FIG. 8 occurred in 60 of those accesses, while in the other 40 accesses, a different sequence occurred, such as $U_1$, $V_1$, $U_2$, $V_2$, $U_5$, $V_5$, i.e., the client opened and performed a "stat" operation on the file but did not read any data. This situation is modeled by the Markov chain with edge counts as depicted in FIG. 12. Thus, when the transaction predictor observes transaction $U_1$ (corresponding to $S_1$), then it knows with very high likelihood that $U_2$ will occur but is only 60% certain that $U_3$ will occur. Given this information, the transaction predictor may choose to perform requests $U_3$ and $U_4$ or not depending on the level of aggressiveness desired. Alternatively, the transaction predictor could allocate a certain bandwidth budget to predictions and perform them only if there is available bandwidth to ship the resulting data across the network. Moreover, the decision to execute predicted transactions could be tied to the segment cloning system described above. For example, if the result of $U_3$ and $U_4$ after passing through the segmentation scheme are represented in just a few bytes, the cost for sending the results across the network are virtually free so the transaction predictor can afford to be aggressive. As a result, the transaction predictor can explore multiple paths through the Markov model simultaneously in a way that controls the impact on the underlying network.

Since transaction patterns evolve and change with time, a single monotonically-increasing edge count can become problematic because over time it will give too much weight to past observations relative to recent observations. An alternative approach is to apply an exponentially weighted moving average to the edge counts. At fixed intervals, all the edge counts are updated by multiplying them by some fixed constant K<1. Yet another approach, which requires less computational overhead, is to limit the sum of edge counts emanating from a node. When the sum reaches or exceeds this limit, the count on each edge emanating from that node is reduced, again by multiplying by K.

Since the number of states and edges can grow over time without bound, learning module 806 may impose a limit on the amount of state that is maintained. Different algorithms may be used to decide which entries to remove from PDB 820 as they become old or infrequently used. For example, a node that corresponds to an operation on a file that has been removed from the file system would eventually be deleted. Because PDB 820 provides a predictive optimization and it is not relied upon for correct operation of the protocol, PDB 820 can maintain a fixed number of entries that are aged and replaced as necessary.

Sentinel-Based Model

One challenge with the literal model described above is the large amount of state that is required to represent every conceivable transaction pattern. While this approach can work well in many environments, it can be improved upon by introducing a mechanism that allows the system to trade off performance for state, while improving performance by providing context-dependent signaling mechanisms. In this approach, certain "sentinel" transactions are used to anchor the transaction stream. Each sentinel transaction represents a state in the Markov chain, and then dynamic prediction state (as well as static logic) is tied to that sentinel state. For example, in the context of a file system protocol, sentinel transactions might correspond to all "file-open" requests. Given this, each state essentially represents the transaction activity associated with the particular file opened in the request at hand. Attached to this state, then, could be dynamically collected information such as how frequently this file is opened and read in its entirety, whether this file is always read sequentially or randomly, how often this file is written to, how and when "stat" operations are applied to this file, how often is this file opened in error, etc.

Given a collection of such information, when a predictor sees (or predicts) an open for a particular file, it can perform a set of predicted transactions that are synthesized using a combination of logic and the dynamic information collected. For example, if the predictor knows that 99% of the time the file is written to and never read, then no predictions might be carried out (because the writes cannot be normally predicted by the predictor). However, if the predictor knows that 99% of the time the file is opened, a few blocks are read, then the file is closed, then usually all of the requests can be effectively predicted and transmitted across the network ahead of the actual requests.

Moreover, information can be maintained about files that do not exist to optimize the case that an application checks for the existence of a file by attempting to open it. This, somewhat surprisingly, can be quite common. To accelerate this case, the predictor can again predict that an open for such a file is forthcoming and issue it ahead of time, moving the error result (i.e., the knowledge that the file does not exist) into the prediction buffer near the client. Again, performance is enhanced in this case because round-trips are shielded from the end-client by working ahead of the client request behavior.

Transformable Transaction Prediction

In certain cases, it is possible to predict the nature of a transaction but not a detailed format that the client request will embody. Often in these cases, there is enough information to make an educated guess about what the client will do, and if the client transaction varies a bit from the predicted transaction, it is possible to convert the predicted result into a result that will satisfy the actual client request. This process is called transformable transaction prediction.

For example, suppose the predictor guessed that the client would issue two 8 kilobyte (KB) reads, but in fact the client issued one 16 KB read. Given the fact that the two 8 KB reads can be easily transformed to a single 16 KB read, the predictor at the client site is free to perform such transformations. Likewise, if the predictor predicted that a file would be opened for both read and write access, but the client opened the file for read-only access, then the predictor is free to use the result of the predicted operation and ensure that no writes are executed by the client (and if locking is present that the write-sharing lock could be preemptively broken so as to not disrupt other client accesses to the file).

Proactive Segment Distribution (PSD) Interfaces

As described above and also in McCanne I, segment cloning can be driven either by client activity or by a server-side process that proactively distributes segments from a server-side engine to one or more client-side engines. Rather than including the complexity of proactive segment distribution (PSD), an engine might simply expose a protocol interface for PSD so that external agents can be built that perform such functions, e.g., for content distribution, file system replication, e-mail delivery, and so forth.

One interface is a simple mechanism that allows an external process to "post" normal data into the system, using HTTP post, for example. For this use, the HTTP message's header is extended (as the protocol allows) to include the destination IP addresses of the client-side engines as well as authentication information. The HTTP post message's body contains raw data. Upon receiving a PSD request, the server-side engine simply pushes the data through the segment-cloning system to the desired client sites. Each client-side engine receives the corresponding segments, updates its segment store, and otherwise discards the original data buffer. In this fashion, the segment store can be pre-populated with data that an external site might know will be of use at that location.

With this interface, the engine architecture effects an important separation of policy and mechanism, i.e., the mechanism for performing PSD is factored out from the myriad of agents that could be built to implement various sorts of replication logic.

This approach is powerful for at least two reasons. First, it allows interesting integration opportunities to be implemented in customer environments either by the customer itself or by consultants. For example, a customer might have an existing business application that could benefit from the ability to move data proactively out of an application server and into client-side engines. With the PSD interface, this could be carried out quite easily in many cases.

Secondly, this approach allows engines to integrate easily with existing server systems. For example, an agent could be placed inside a file server that monitored file system activity and based on configured policies, performed segment distribution in response to file changes. This approach is quite elegant because it achieves most all the benefits of file system mirroring without actually having to mirror the file system. Additionally, unlike point-in-time systems, which are continually out of date with respect to the master file server, in the present approach, the client site can remain 100% synchronized with the master file server because engines logically send all transactions back to the server (even though the data might be actually mirrored and not sent over the network when a client accesses it).

Variations

With knowledge of the underlying client-server protocol, transaction accelerators can inject transactions toward the server in anticipation of client needs and provide the response to the client with less latency. In some cases, the accelerators can short-circuit a client transaction and not forward it on to the server if the accelerators can ensure the semantics of the underlying protocol are preserved. However, in other cases accelerators need not have complete information about the underlying protocol and just match up requests and responses, while the server (or other element) ensures that an accelerator is not given data in a manner that a client would get data that is incorrect. When combined with segment cloning or other transformations, transactions can be injected aggressively toward the server with little resulting impact on the network, thereby providing greater transaction performance to the end client.

In some cases, protocol specific enhancements might be used. For example, where a protocol includes response packets, a client might initiate a file open transaction by sending a file open request. One of a pair of accelerators (client-side, server-side) might predict a transaction and generate a synthetic request to the server, such as a request to read the first block of the file that is being opened. The server-side accelerator might then receive the response to the read request and include that data in a response message send back to the client acknowledging the file open request. The client-side accelerator could then store that read data and use it to make up a response for the client request for a file read, if and when that client request comes in as predicted.

SUMMARY

Using the acceleration engine and a transaction predictor, distributed infrastructure can have a performance as if it were centralized, thus allowing key assets to be centralized rather than being duplicated at multiple distributed sites. One advantage of this is that systems that assume that they are local resources, and behave accordingly on a network, can be implemented remotely while maintaining the performance of local access.

Transaction prediction processes take advantage of the highly predictable nature of most applications and can pipeline multiple transaction requests into single transactions whenever possible. Notably, transaction prediction also works where some transactions are not predictable and others are partially predictable. Transaction prediction might result in a synthetic transaction request being generated in advance of the actual request, with the results of the synthetic transaction being held until the predicted transaction actually occurs.

In addition to better supporting systems that expect local access levels of performance, acceleration engine is as described herein can enable new services that are otherwise impractical, such as remote branch office database backups.

The acceleration engine can be implemented without client or server changes and can thus be entirely transparent. Furthermore, with the automatic proxy discovery mechanisms and techniques described in McCanne IV, engines can pair up to provide improved network performance without the clients or servers even needing to be aware of the presence of the acceleration engines.

The acceleration engines need not be tied to any particular protocol or application. Some versions might support a limited set of commonly used protocols (i.e., CIFS, NFS, HTTP, FTP, WebDAV, Remote Backup, etc.), with extensibility over time as users dictate.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A network transaction accelerator for accelerating transactions involving data transfer between at least one client and at least one server over a network, wherein a transaction involves a request and at least one response in response to the request, the network transaction accelerator comprising:
   a client-side engine coupled to a client;
   a server-side engine, coupled to the server;
   a transaction predictor that is configured to synthesize, based on past transactions, one or more predicted transactions, wherein transactions comprise sets of steps that result in data moving from one place to another;
   a transaction mapper that replaces transaction identifiers of predicted transactions with corresponding transaction identifiers of actual transactions;
   wherein the client-side engine comprises:
   a) an input for receiving indications of requests from the client;
   b) a transaction buffer for storing results of the predicted transactions received from the server or the server-side engine ahead of receipt of a corresponding request; and
   c) a collator for collating the requests from the client with the stored results or received results, wherein a request and a response that are matched by the collator are identified and the matched response is provided to the client in response to the matched request; and
   wherein the server-side engine comprises:
   a) an input for receiving indications of transactions including received requests and received responses; and
   b) an output for conveying requests to the server in response to actual transactions or predicted transactions.

2. The network transaction accelerator of claim 1, wherein the transaction predictor is within the server-side engine.

3. The network transaction accelerator of claim 1, wherein the transaction predictor is within the client-side engine, the client-side engine further comprising logic to transmit one or more messages to the server-side engine indicating which transactions are being predicted and the server-side engine further comprising logic to receive the one or more messages and generate requests corresponding to the predicted transactions and convey those requests to the server in advance of receipt of the requests corresponding to requests of the predicted transactions.

4. The network transaction accelerator of claim 1, further comprising as part of the client-side engine a first persistent segment storage and a first segment encoder and as part of the server-side engine a second persistent segment storage and a second segment encoder.

5. The network transaction accelerator of claim 4, further comprising means for conveying segment mappings between the first persistent segment storage and the second persistent segment storage.

6. The network transaction accelerator of claim 1, further comprising:
   a transaction mapping table that maps transaction identifiers of actual requests and transaction identifiers of synthetic requests to the mapped transaction identifiers, such that responses to requests are uniquely identifiable by their mapped transaction identifiers even when transaction identifiers of the synthetic requests might overlap with transaction identifiers of actual requests.

7. The network transaction accelerator of claim 1, wherein the transaction predictor comprises:
   a prediction database comprising records of past transactions and relationships among past transactions; and
   a predictor module that synthesizes, based at least partially on the contents of the prediction database, the predicted transactions.

8. The network transaction accelerator of claim 7, wherein the predictor module operates using dynamic prediction logic including a Markov model.

9. The network transaction accelerator of claim 7, wherein the predictor module operates using heuristics.

10. The network transaction accelerator of claim 7, wherein the predictor module takes into account impact on the network of results of predicted transactions in determining a measure of aggressiveness for predictions.

11. The network transaction accelerator of claim 7, wherein the predictor module operates using static prediction logic including protocol-specific rules.

12. The network transaction accelerator of claim 7, wherein the predictor module operates using dynamic prediction logic including a Markov model and wherein the prediction database includes storage for the Markov model as a set of states and a set of edges, wherein a state of the set of states represents a single request or a sequence of requests and an edge of the set of edges represents a predictive relationship between states of the set of states.

13. The network transaction accelerator of claim 12, wherein the transaction predictor comprises logic to use sentinel transactions to provide context-dependent signaling mechanisms, wherein a sentinel transaction represents a state in the Markov model and prediction depends on the sentinel state.

14. The network transaction accelerator of claim 1, wherein the transaction predictor is configured to predict future transactions based on both programmatic knowledge of underlying protocols and past transactions.

15. The network transaction accelerator of claim 14, wherein the underlying protocols include one or more protocols from a group consisting of: TCP, CIFS, NFS, HTTP, FTP, WebDAV and Remote Backup.

16. In a network wherein a client sends messages over a transport connection to a server and receives messages over the transport connection from the server, wherein a network transaction involves a request message and at least one response message in response to the request, a method of accelerating network transactions comprising:
   a) terminating the transport connection at a client-side proxy and at a server-side proxy, the client-side proxy coupled to the client and the server-side proxy coupled to the server;
   b) receiving a request message at the server-side proxy from the client-side proxy and forwarding the request message to the server;
   c) transmitting a predicted request to the server from the server-side proxy, wherein the predicted request is based at least in part on past transactions;
   d) receiving a corresponding response to the predicted request at the server-side proxy from the server;

e) transmitting the corresponding response, from the server-side proxy to the client-side proxy;

f) receiving a client request at the client-side proxy from the client that can be satisfied by the corresponding response; and g) transmitting the corresponding response to the client from the client-side proxy in response to the client request, wherein said transmitting involves replacing a transaction identifier of the corresponding response with a transaction identifier of the client request.

17. The method of claim 16, further comprising modifying the corresponding response into a modified response as needed to comply with client expectations as to response form.

18. The method of claim 16, further comprising segmenting message data and replacing segment data with segment references.

19. The method of claim 16, further comprising:

h) determining an amount of network usage reduction that would be obtained for different numbers of predicted requests; and i) transmitting a number of predicted requests from the server-side proxy wherein the number is based on an optimization on the amount of network usage reduction, whereby the number of predicted requests is based on the amount of network usage reduction to be had by those requests.

20. The method of claim 16, further comprising:

storing, after at least step e), a representation of the corresponding response in memory locally accessible to the client-side proxy; and deleting the stored representation from the memory after step g).

21. In a network wherein a client sends messages over a transport connection to a server and receives messages over the transport connection from the server, wherein a network transaction involves a request message and at least one response message in response to the request, a method of accelerating network transactions comprising:

a) terminating the transport connection at a client-side proxy and at a server-side proxy, the client-side proxy coupled to the client and the server-side proxy coupled to the server;

b) receiving a plurality of messages at the server-side proxy;

c) transmitting a predicted request to the server from the server-side proxy, for each of some or all of the plurality of messages, wherein the predicted request is based at least in part on a pattern among the contents of the corresponding messages;

d) receiving a corresponding response to the predicted request at the server-side proxy from the server for each of some or all of the predicted requests;

e) transmitting the corresponding responses, from the server-side proxy to the client-side proxy;

f) receiving client requests at the client-side proxy from the client some of which can be satisfied by one or more of the corresponding responses; and g) transmitting the satisfying corresponding responses to the client from the client-side proxy in response to their corresponding client requests, wherein said transmitting involves replacing transaction identifiers of the satisfying corresponding responses with transaction identifiers of their corresponding client requests.

22. The method of claim 21, further comprising modifying the corresponding responses into modified responses as needed to comply with client expectations as to response form.

23. The method of claim 21, further comprising segmenting message data and replacing segment data with segment references.

24. The method of claim 21, further comprising:

h) determining an amount of network usage reduction that would be obtained for different numbers of predicted requests; and i) transmitting a number of predicted requests from the server-side proxy wherein the number is based on an optimization on the amount of network usage reduction, whereby the number of predicted requests is based on the amount of network usage reduction to be had by those requests.

25. The method of claim 21, further comprising, at least prior to step b), receiving acceleratable requests at the server directly or indirectly from the client where the acceleratable requests are such that the messages in step b) are sent from the server to the server-side proxy at least as part of a response to the acceleratable requests.

26. The method of claim 21, further comprising:

storing, after at least step e), representations of the corresponding responses in memory locally accessible to the client-side proxy; and deleting stored representations from the memory as responses that satisfy the client requests are transmitted to the client from the client-side proxy.

27. In a network wherein a client sends messages over a transport connection to a server and receives messages over the transport connection from the server, wherein a network transaction involves a request message and at least one response message in response to the request, a method of accelerating network transactions comprising:

a) terminating the transport connection at a proxy, the proxy coupling the client to the server for at least some of the traffic between the client and server;

b) receiving a request message at the proxy and forwarding the request message toward the server;

c) transmitting a predicted request to the server from the proxy, wherein the predicted request is based at least on past transactions;

d) receiving a corresponding response to the predicted request at the proxy from the server;

e) buffering, at the proxy, the corresponding response in anticipation of a client request corresponding to the predicted request;

f) receiving a client request at the proxy from the client that can be satisfied by the corresponding response; and g) transmitting the corresponding response to the client from the proxy in response to the client request, wherein said transmitting involves replacing a transaction identifier of the corresponding response with a transaction identifier of the client request.

28. The method of claim 27, further comprising modifying the corresponding response into a modified response as needed to comply with client expectations as to response form.

29. The method of claim 27, further comprising segmenting message data and replacing segment data with segment references.

30. The method of claim 27, further comprising:
h) determining an amount of network usage reduction that would be obtained for different numbers of predicted requests; and
i) transmitting a number of predicted requests from the proxy wherein the number is based on an optimization on the amount of network usage reduction, whereby the number of predicted requests is based on the amount of network usage reduction to be had by those requests.

31. The method of claim 27, further comprising, at least prior to step b), receiving an acceleratable request at the server directly or indirectly from the client where the acceleratable request is such that the message sent from the server to the proxy in step b) is at least part of a response to the acceleratable request.

32. The method of claim 27, wherein buffering is done by storing in a memory, the method further comprising deleting the stored representation from the memory after step g).

33. The method of claim 27, further comprising data segmentation performed by the proxy.

* * * * *